US006717154B2

(12) United States Patent
Black et al.

(10) Patent No.: US 6,717,154 B2
(45) Date of Patent: Apr. 6, 2004

(54) EVALUATION OF IRRADIATED FOODS AND OTHER ITEMS WITH TELEMETRIC DOSIMETERS AND ASSOCIATED METHODS

(75) Inventors: Robert D. Black, Chapel Hill, NC (US); Gregory Glenwood Mann, Raleigh, NC (US); Steven R. Widener, Wake Forest, NC (US)

(73) Assignee: Sicel Technologies, Inc., Morrisville, NC (US)

( * ) Notice: Subject to any disclaimer, the term of this patent is extended or adjusted under 35 U.S.C. 154(b) by 182 days.

(21) Appl. No.: 09/919,395

(22) Filed: Jul. 31, 2001

(65) Prior Publication Data

US 2002/0040968 A1 Apr. 11, 2002

Related U.S. Application Data

(60) Provisional application No. 60/222,502, filed on Aug. 2, 2000.

(51) Int. Cl.[7] .................................................. G01T 1/24
(52) U.S. Cl. ...................... 250/393; 250/397; 250/492.3
(58) Field of Search ................................ 250/393, 397, 250/492.3, 492.1

(56) References Cited

U.S. PATENT DOCUMENTS

| | | | | |
|---|---|---|---|---|
| 4,475,401 A | * | 10/1984 | Punia et al. | 73/658 |
| 4,484,076 A | * | 11/1984 | Thomson | 250/370.07 |
| 4,554,639 A | * | 11/1985 | Baker et al. | 702/1 |

(List continued on next page.)

FOREIGN PATENT DOCUMENTS

| | | | | |
|---|---|---|---|---|
| EP | 0537761 A2 | 4/1993 | | |
| JP | 63221278 | 9/1988 | | G01T/1/04 |
| JP | 02147882 | 6/1990 | | G01T/1/02 |
| JP | 07306269 | 11/1995 | | G01T/1/17 |
| SU | 414900 | 7/1976 | | G01T/1/12 |
| SU | 1603314 A1 | 10/1990 | | G01T/1/02 |
| WO | WO 98/58250 | 12/1998 | | |

OTHER PUBLICATIONS

National Aeronautics and Space Administration, *Extravehicular Activity Radiation Monitoring (EVARM)*, Fact Sheet FS 2001–11–192–MSFC, abstract review, 10/01.
Reece M.H. et al., *Semiconductor Mosfet Dosimetery*, Health Physics Society annual Meeting, pp. 1–14, 1988.
Shortt, Dr. Ken et al., *A New Direct Reading Extremity Dosimeter—How the ED–1 Sensor works*, Health Physics Society Annual Meeting, Jul. 1994.
Soubra, M. et al., *Evaluation of a dual bias dual metal oxide–silicon semiconductor field effect transistor detector as radiation dosimeter*, American Assoc. Phys. Med., vol. 21, No. 4, pp. 567–572, Apr. 1994.
Farrar IV, Harry et al., *Gamma–Ray Dose Mapping in Operational Candu Reactor Containment Areas Using MOS Dosimeters*, pp. 441–446, Reactor Dosimetry, ASTM, 1994.

(List continued on next page.)

*Primary Examiner*—Constantine Hannaher
*Assistant Examiner*—Otilia Gabor
(74) *Attorney, Agent, or Firm*—Myers Bigel Sibley & Sajovec, PA

(57) ABSTRACT

Methods for quantifying the irradiation dose received by an item or items, such as food items and medical items, undergoing irradiation-based sterilization, includes the steps of monitoring a selected electronic parameter associated with an economic single use sensor positioned adjacent the item or items and telemetrically relaying data associated with the monitored electronic parameter to a computer. The computer includes a computer program which is configured to determine the radiation dose received by the item or items by correlating the value of the monitored electronic parameter to a corresponding amount of radiation associated with the value. Related sensors and systems are also described.

78 Claims, 28 Drawing Sheets

U.S. PATENT DOCUMENTS

| | | | | |
|---|---|---|---|---|
| 4,556,063 A | | 12/1985 | Thompson et al. | 128/419 PT |
| 4,575,676 A | | 3/1986 | Palkuti | 324/158 D |
| 4,678,916 A | | 7/1987 | Thomson | 250/370 |
| 4,804,847 A | | 2/1989 | Uber, III | 250/370 F |
| 4,913,153 A | * | 4/1990 | Hagmann et al. | 600/407 |
| 4,970,391 A | | 11/1990 | Uber, III | 250/374 |
| 4,976,266 A | | 12/1990 | Huffman et al. | 128/659 |
| 5,117,113 A | | 5/1992 | Thomson et al. | 250/370.07 |
| 5,400,382 A | * | 3/1995 | Welt et al. | 378/69 |
| 5,444,254 A | | 8/1995 | Thomson | 250/370.07 |
| 5,476,634 A | * | 12/1995 | Bridges et al. | 422/22 |
| 5,477,050 A | * | 12/1995 | Kronenberg et al. | 250/336.1 |
| 5,543,111 A | * | 8/1996 | Bridges et al. | 422/22 |
| 5,609,820 A | * | 3/1997 | Bridges et al. | 422/23 |
| 5,620,472 A | | 4/1997 | Rahbari | 128/903 |
| 5,656,998 A | * | 8/1997 | Fujiuchi et al. | 340/571 |
| 5,744,094 A | * | 4/1998 | Castberg et al. | 422/24 |
| 5,787,144 A | * | 7/1998 | Findlay | 378/69 |
| 5,847,391 A | * | 12/1998 | Sephton et al. | 250/336.1 |
| 5,855,203 A | * | 1/1999 | Matter | 128/207.14 |
| 5,880,477 A | | 3/1999 | Perilleux et al. | 250/492.3 |
| 5,949,075 A | * | 9/1999 | Kishi | 250/370.07 |
| 6,165,155 A | * | 12/2000 | Jacobsen et al. | 604/156 |
| 6,177,677 B1 | * | 1/2001 | Alboresi et al. | 250/453.11 |
| 6,398,710 B1 | * | 6/2002 | Ishikawa et al. | 600/3 |
| 6,429,444 B1 | * | 8/2002 | Korenev et al. | 250/492.3 |

OTHER PUBLICATIONS

Thomson, I. et al., *Radiation Dosimetry with MOS Sensors,* Radiation Protection Dosimetry, Viol. 6, No. 1–4, Nuclear Technology Publishing, pp. 121–124, 1984.

Grätz et al.; "Smart card for detection of alpha radiation" *Sensors and Actuators* 61 431–435 (1997).

International Search Report for PCT/US 01/24187, mailed Jul. 31, 2001.

Akin et al., *RF telemetry powering and control of hermetically sealed integrated sensors and actuators,* Proc. Solid-State Sensors & Actuators Workshop, Hilton Head, SC, pp. 145–148 (1990).

Dienes et al., *Radiation Effects in Solids, Interscience Monographs in Physics and Astronomy,* vol. II, Interscience Publishers, Inc., pp. 1–4; 56–85; 90–122 and 129–177 (©1957).

Ma et al., in *Ionizing Radiation Effects in MOS Devices and Circuits,* John Wiley & Sons, pp. 35–46 (1989).

Messenger et al., *The Effects of Radiation on Electronic Systems,* Van Nostrand Reinhold, pp 332–349 (1992).

Puers et al., *A low power multi–channel sensor interface for use in digital telemetry,* Sensors and Actuators A, vols. 37–38, pp. 260–267 (1993).

Stenson et al., *Effects of implantable biomaterials on radiation dosimetry,* Head Neck, vol. 19, No. 5 pp. 384–390 (Aug. 1997).

* cited by examiner

LIST OF FOODS APPROVED FOR IRRADIATION IN THE USA

| PRODUCT | TYPE OF CLEARANCE | DATE | DOSE MAX (kGy) |
|---|---|---|---|
| ANIMAL FEED AND PET FOOD | UNCONDITIONAL | SEP-95 | 25.00 |
| APPLE | UNCONDITIONAL | APR-86 | 1.00 |
| APRICOT | UNCONDITIONAL | APR-86 | 1.00 |
| APRICOT (DRIED) | UNCONDITIONAL | APR-86 | 1.00 |
| AVACADO | UNCONDITIONAL | APR-86 | 1.00 |
| BANANA | UNCONDITIONAL | APR-86 | 1.00 |
| CHERRIES | UNCONDITIONAL | APR-86 | 1.00 |
| CHICKEN | UNCONDITIONAL | MAY-90 | 3.00 |
| CHICKEN MEAT (MECHANICALLY SEPARATED) | UNCONDITIONAL | MAY-90 | 3.00 |
| CURRANTS, RED | UNCONDITIONAL | APR-86 | 1.00 |
| DATES | UNCONDITIONAL | APR-86 | 1.00 |
| ENZYMES (DEHYDRATED) | UNCONDITIONAL | APR-86 | 10.00 |
| FIGS (DRIED) | UNCONDITIONAL | APR-86 | 1.00 |
| FRUIT | UNCONDITIONAL | APR-86 | 1.00 |
| FRUITS (DRIED) | UNCONDITIONAL | APR-86 | 1.00 |
| GRAPES | UNCONDITIONAL | APR-86 | 1.00 |
| GUAVA | UNCONDITIONAL | APR-86 | 1.00 |
| HERBS | UNCONDITIONAL | APR-86 | 30.00 |
| JUJUBE (DRIED) | UNCONDITIONAL | APR-86 | 1.00 |
| LEMON | UNCONDITIONAL | APR-86 | 1.00 |
| LITCHI | UNCONDITIONAL | APR-86 | 1.00 |
| MANDARIN | UNCONDITIONAL | APR-86 | 1.00 |
| MANGO | UNCONDITIONAL | APR-86 | 1.00 |
| MEAT | UNCONDITIONAL | DEC-97 | 4.50 |
| MELON | UNCONDITIONAL | DEC-97 | 7.00 |
| ORANGE | UNCONDITIONAL | APR-86 | 1.00 |
| PAPAYA | UNCONDITIONAL | APR-86 | 1.00 |
| POTATO | UNCONDITIONAL | JAN-64 | 0.15 |
| PEAR | UNCONDITIONAL | APR-86 | 1.00 |
| PARSIMMON | UNCONDITIONAL | APR-86 | 1.00 |
| PINEAPPLE | UNCONDITIONAL | APR-86 | 1.00 |
| PLUM | UNCONDITIONAL | APR-86 | 1.00 |
| PORK | UNCONDITIONAL | JUL-85 | 1.00 |
| POULTRY | UNCONDITIONAL | MAR-90 | 3.00 |
| POULTRY PRODUCTS | UNCONDITIONAL | MAR-90 | 3.00 |
| RAISINS | UNCONDITIONAL | APR-86 | 1.00 |
| SPICES | UNCONDITIONAL | APR-86 | 30.00 |
| STRAWBERRY | UNCONDITIONAL | APR-86 | 1.00 |
| VEGETABLES | UNCONDITIONAL | APR-86 | 1.00 |
| VEGETABLES (DRIED) | UNCONDITIONAL | APR-86 | 1.00 |
| VEGETABLE SEASONINGS | UNCONDITIONAL | APR-86 | 30.00 |
| WHEAT | UNCONDITIONAL | JAN-63 | 0.50 |
| WHEAT FLOUR | UNCONDITIONAL | JAN-63 | 0.50 |
| WHITE POTATOES | UNCONDITIONAL | JAN-64 | 0.15 |

*FIG. 1B.*

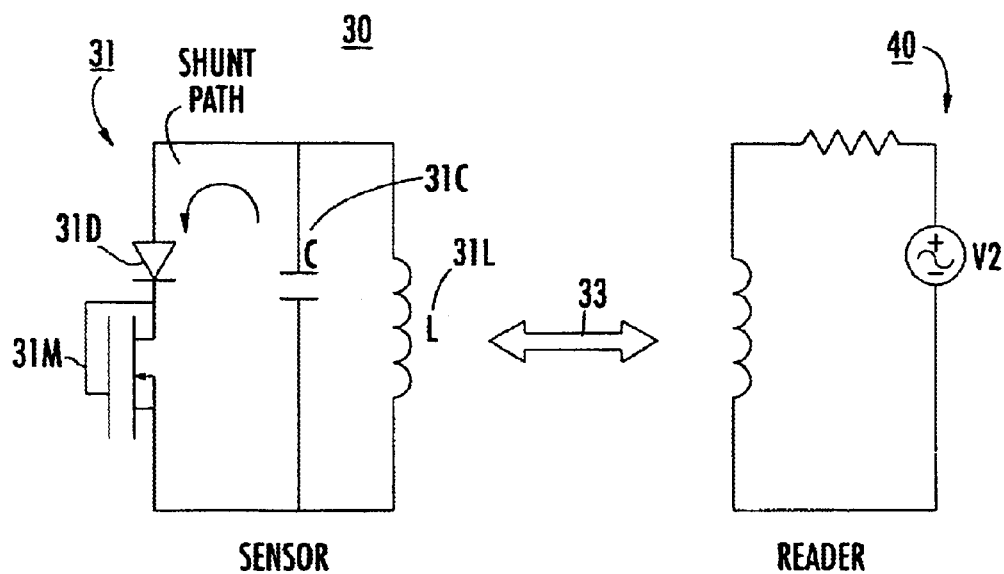
FIG. 5A.
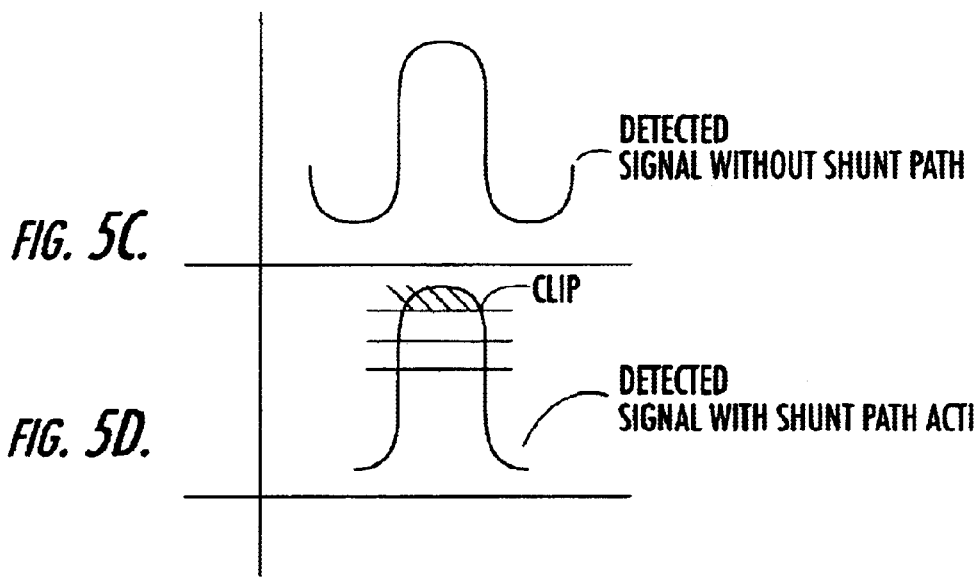
FIG. 5C.
FIG. 5D.

P-CHANNEL MOSFET IMPLEMENTATION

N-CHANNEL MOSFET IMPLEMENTATION

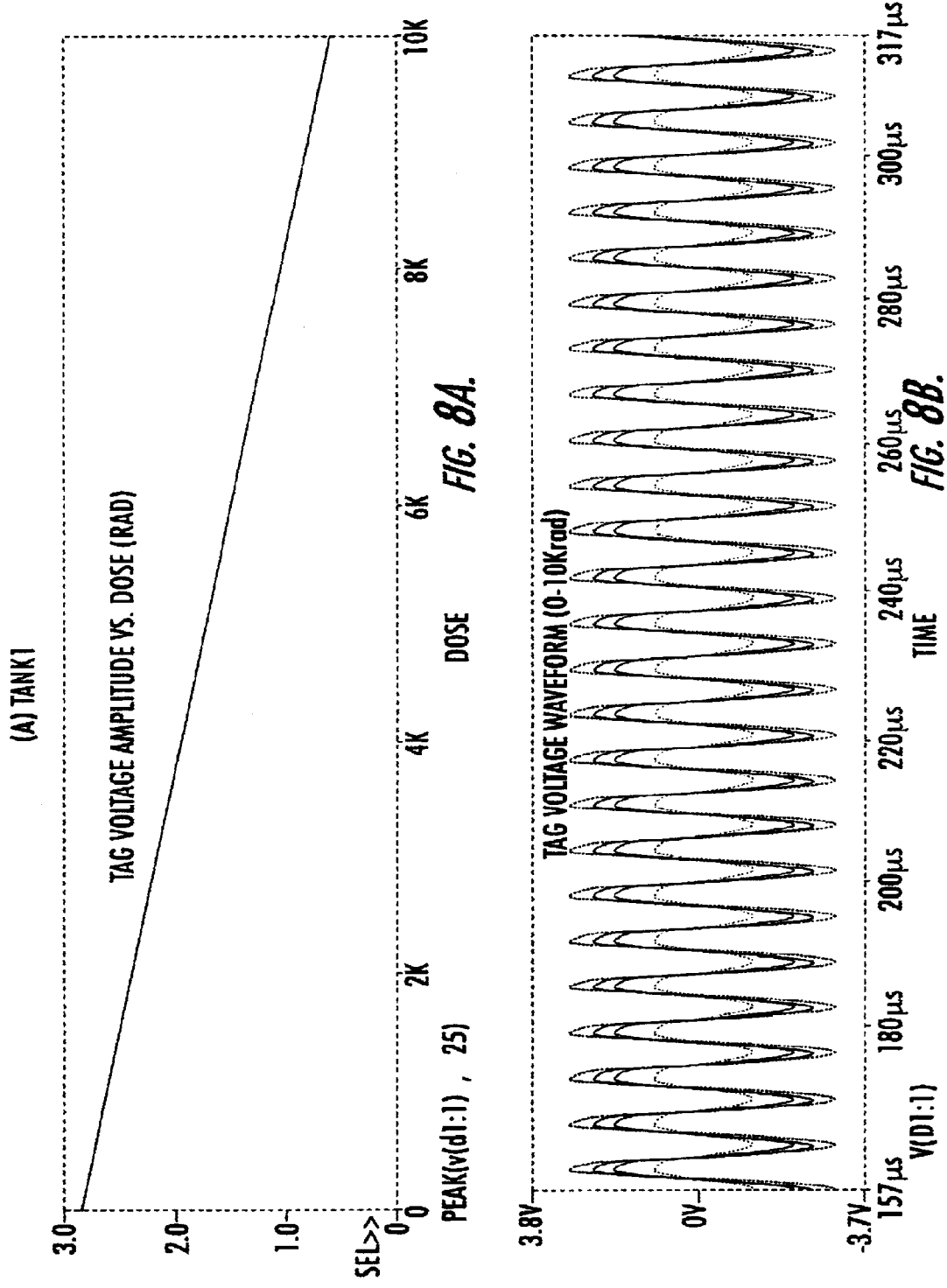

2N2222A Hfe vs. Total Dose.

Operational waveforms

Operational waveforms

Operational waveforms

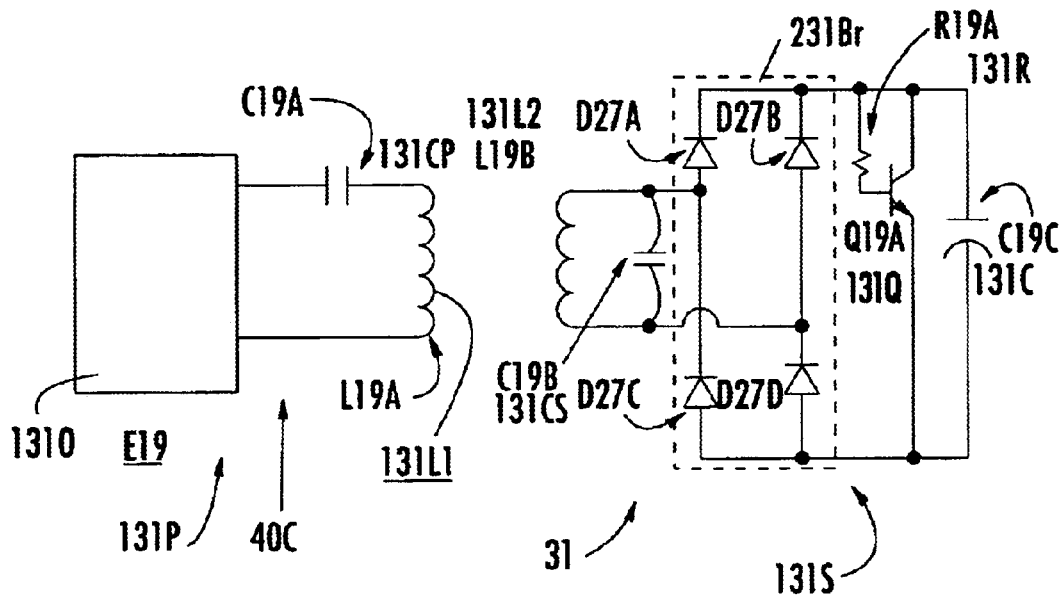
FIG. 27.
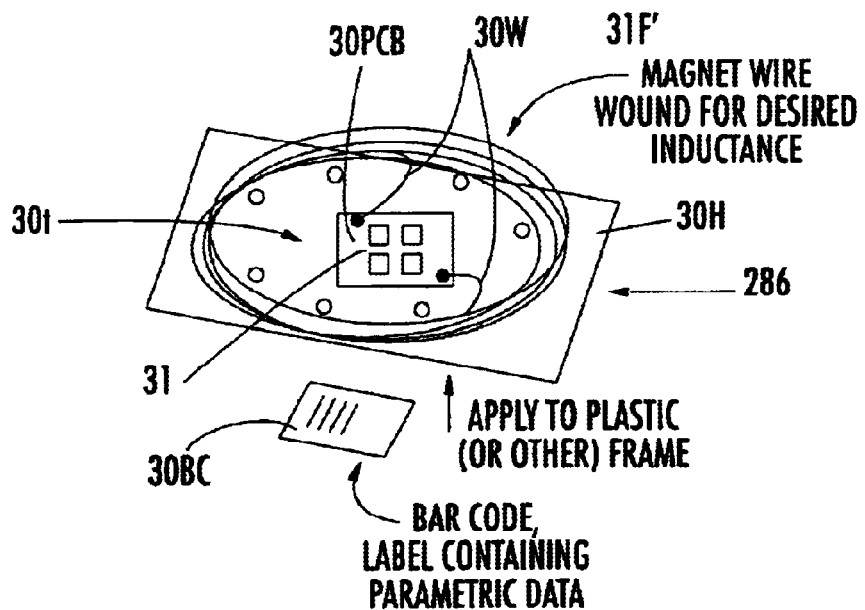
FIG. 28. DOSIMETRY TAG

EVALUATION OF IRRADIATED FOODS AND OTHER ITEMS WITH TELEMETRIC DOSIMETERS AND ASSOCIATED METHODS

RELATED APPLICATIONS

This application claims the benefit of priority from U.S. Provisional Patent Application Ser. No. 60/222,502, filed Aug. 2, 2000; the contents of this application are hereby incorporated by reference as if recited in full herein.

FIELD OF THE INVENTION

The present invention generally relates to the assessment or quantitative evaluation of the amount of radiation delivered to an object undergoing sterilization in situ.

BACKGROUND OF THE INVENTION

Providing a food supply that is safe for consumption can be problematic, particularly because suitable control measures can be hard to enforce as the producers, distribution chains, and markets become more global. In addition, visual inspections are not always reliable as a means of detecting harmful contaminants. Further, cross contamination of foods can occur during handling (including during harvesting, shipping, and packaging), that can infect food typically believed to be relatively safe from pathogens. For example, E. coli bacteria, which is typically found in certain meats, can also be found in "fresh" vegetables and fruits. The presence of atypical bacteria in foods can be attributed to the use of particular types of fertilizers or to processing conditions. Certain processing conditions may allow direct contact of various food items with contaminated products, while others may allow for indirect contamination such as via contact with contaminated containers or work surfaces, each of which can allow the undesirable spreading of contaminants.

Certain safety precautions can be taken to reduce the risk of illness associated with the consumption of foods which may carry pathogens, such as washing the fruit and vegetables before consumption and/or cooking meat or other food items to or above a certain temperature. While washing vegetables and fruits can dilute or remove the contaminant(s) from the food, and cooking the food to a temperature sufficient to kill the bacteria may reduce the exposure risk, not all foodstuffs are washed or properly cooked before they are eaten. Further, children can be especially vulnerable to harmful exposures, as many do not reliably pursue these safety measures and exposure to relatively small amounts of harmful contaminants can be more profound relative to healthy adults. A consumer has little control over what safety steps (i.e., washing and/or cooking food properly), are followed by personnel at a food service outlet.

Processing foods to reduce or even eliminate unwanted microorganisms can be an important step forward in the reduction and elimination of the risk of illness due to exposures to contaminated foods. One economic and effective way to rid food of contaminating microorganisms is to irradiate food with ionizing radiation to effectively "sterilize" the food to destroy the harmful microorganisms therein (irradiation can be used to sterilize other objects such as medical devices). This can be an effective and economic tool in improving the safety of the food supply to thereby provide safe, sterilized food items which have reduced (and potentially even undetectable) levels of harmful microorganisms.

Generally stated, there are two primary modalities used to irradiate food and other items to achieve sterilization. One modality includes the use of a radioactive element such as Cobalt-60, and the other employs electron beams produced by a linear accelerator. The radiation dose should be monitored to ensue that pathogens are destroyed effectively. For food or edible items, radiation doses in the 0.15 kGy to 10 kGy range are typically used, while for devices and objects, radiation doses are higher, typically up to 20 kGy or more.

Conventionally, in order to monitor the radiation doses provided by the irradiation process, either TLD's (thermoluminescent devices) or chromatic tags are used. TLD's can be generally described as crystals, e.g., lithium fluoride, the structure of which is changed (damaged) during exposure to radiation. More particularly, during irradiation, electrons travel to and are trapped in the crystal after being ejected by the high-energy (ionizing) photons used for sterilization. Upon exposure to heat, the electrons in the crystal fall back to their ground states and emit light as result of the change. A spectrophotometer is used to measure this light and provide a quantitative assessment of the amount of radiation to which the device was exposed. A technician typically recovers the TLD from an irradiated package and then analyzes/measures the emitted light on the spectrophotometer. Unfortunately, this process can be relatively labor-intensive and can be undesirable for use in a mass production environment.

Chromatic tags can be described as plastic tags (formed of materials such as PMMA) which undergo a color change upon exposure to radiation at some level. However, generally stated, the color change is often a subjective evaluation when done visually by an inspector. To receive a more reliable assessment, colormetric readers are used to quantify the color change to a more exact level. This can be compared to the use of radiographic film wherein the level of exposure on the film corresponds to the intensity of the dose received. Unfortunately, again, the determination of the dose measured in this manner can also be labor intensive and/or unsuitable for a mass-production environment.

OBJECTS AND SUMMARY OF THE INVENTION

It is therefore an object of the present invention to provide a cost-effective dosimeter, which can be used to evaluate the radiation dose delivered to an item undergoing sterilization.

It is yet another object of the present invention to provide improved methods to evaluate a radiation dose(s) delivered to a plurality of sterilized packaged food items without requiring direct human intervention.

It is a further object of the present invention to provide economic methods and devices which are suitable for mass-production environments and which can automatically relay and/or correlate production and/or process information to an irradiation dose.

It is an additional object of the present invention to provide an economic automated method of determining the amount of radiation delivered to an item in situ.

It is another object of the present invention to provide an economic dosimeter configuration, the sensing element of which can be embedded in a packaged and/or sealed food or medical item.

These and other objects can be satisfied by the present invention by a radiation dosimeter which is adapted to change the value of an associated electronic parameter in a detectable manner dependent upon the amount of radiation it is exposed to. The value of the electronic parameter can be relayed automatically (or semi-automatically) and used to determine and provide the radiation dose for a sterilized item, preferably a food or edible item, without requiring human intervention. The sensor can be configured as a single use, disposable, passively operated wireless or telemetrically operated sensor.

More particularly, a first aspect of the invention is a method for determining the irradiation dose delivered to an object. The method includes the steps of (a) irradiating at least one object with a radiation dose which is sufficient to sterilize the object; (b) positioning a sensor on the object such that it is held proximate the object during the irradiating step, the sensor has associated operational parameters, and one or more of the operational parameters is configured to change responsive to the irradiating step; (c) transmitting data associated with the operational change in the parameter of the sensor; and (d) determining the radiation exposure dose based on the data provided by the transmitting step. In certain embodiments, the transmitting step can be performed such that is carried out by a wireless or telemetric transmission.

A second aspect of the present invention is a radiation dose evaluation system. The system includes a radiation source and at least one dosimeter sensor adapted to be positioned on an object undergoing irradiation treatment such that the sensor is exposed to an amount of radiation representative of the amount of radiation exposure introduced to the object. The system also includes a wireless or telemetric reader operably associated with the sensor such that it receives data associated with the sensor and a controller operably associated with the reader. The system also includes a computer program operably associated with the controller. The computer program can be configured to analyze data transmitted from the sensor to the reader or receiver to determine a radiation dose associated therewith.

In certain embodiments, the system is configured to evaluate radiation levels above about 0.1 kGy, and typically for food or edible items, in a range of from about 0.15–10 kGy (with pet and animal foods, spices, melon, herbs and seasonings approved up to about 30 kGy), but more typically about 1–7 kGy, and for other sterilized items such as medical implements and devices in a range of from about 10–50 kGy.

Another aspect of the present invention is a passively operated (it does not require a power source such as its own battery) radiation dose sensor. The sensor includes a "tank" circuit which, in operation, is configured to provide an electrical output that changes in a predictable (dose-correlated) manner when exposed to radiation in the desired irradiation dose range (for many food items above about 0.1 kGy, and more preferably in the 0.1–10 kGy range). The sensor tank circuit includes a capacitor and an inductor operably associated with the capacitor. In operation, the sensor is passively configured to be inductively powered by a remote reader/receiver (without requiring a battery or voltage regular or discrete power source on the sensor itself). Thus, the sensor is configured such that it alters at least one electrical property responsive to the amount of exposure to radiation which is then used to determine the amount of radiation the sensor receives (and/or is exposed to).

In certain embodiments, the sensor is passively configured to provide a reflected signal output and has an electronic circuit comprising a MOS device such as a MOS capacitor or FET structure semiconductor device configured to withstand and provide a wireless or telemetrically detectable radiation sensitive output responsive to particular levels of irradiation exposure (for most food items, the operational range is in about the 0.1–10 kGy range, see FIG. 1B). In other embodiments, the electronic circuit comprises other components and parameters to evaluate radiation dose, such as the Hfe or β of a bipolar transistor or the leakage current of a diode or the coupling factor (K) between primary and secondary circuits.

In certain embodiments, the sensor circuit semiconductor or MOS device is a RADFET which is sensitive in the irradiation dose range being monitored (i.e., it has a suitable rad-hardness corresponding to the food item undergoing electronic sterilization). The RADFET is operably associated with a flat form coil (typically secured or bonded to a copper or foil or mylar coil). The sensor circuit has a pre-irradiation exposure threshold voltage value and a threshold voltage which varies corresponding to the irradiation level to which it is exposed. The threshold voltage can be used to determine the radiation dose delivered to the sensor (and with the sensor on or in proximity to the product, to the product itself).

The detection system can be configured to detect other electronic outputs or parameters. For example, the sensor tank circuit can have a detectable first resonant frequency prior to exposure to radiation above a threshold level, and a plurality of altered or changed resonant frequencies different from the first resonant frequency corresponding to the amount of radiation exposure it experiences above the threshold level. Alternatively, or in addition to, the sensor electronic circuit can be configured such that it alters its Q factor based on exposure to radiation and, as such, the Q factor values can then correlated to the radiation exposure level to determine the associated radiation dose.

In an alternative embodiment, the sensor tank circuit can be configured with a capacitor having a central dielectric formed of a material which changes one or more of its conductivity, capacitance value, or dielectric constant responsive to radiation exposure level.

As noted above, for edible items, the sensor is preferably configured to detect radiation doses in the range of from about 0.1–10 kGy, and more preferably about 0.5–10 kGy and for other items such as medical devices, the sensor is preferably configured to detect radiation doses in the range of from about 10–50 kGy. Of course, application specific sensors or sensors which operate in more narrow ranges within the overall range of interest (suitable for more than one product type) can also be provided to allow for a more narrow radiation sensitive sensor (i.e., one for beef and/or poultry, one for pet food, one for fruit, one for grains, etc., or a 0.1–0.5 kGy, a 0.5–2 kGy, a 2–4 kGy, a 1–4 kGy, a 2–5 kGy, and the like).

The sensor may also be configured with a low profile when viewed from the side to allow for easier processing and a reduced likelihood of handling damage which may occur in a mass production environment. Indeed, the sensor may be integrated into a package configured to hold the object undergoing irradiation. The package may be sealed with the sensor thereon or therein prior to irradiation.

Another aspect of the invention is a method for determining the radiation dose of a product. The method includes the steps of (a) positioning a sensor with a tank circuit on an object; and (b) irradiating the object and the sensor to a level which is sufficient to sterilize the object and to induce alteration in a predetermined operational parameter of the sensor, the degree of alteration representative of the amount of irradiation received by the sensor. The data may be wirelessly transmitted from the sensor to a receiver.

In certain embodiments, the object is sealed within a container prior to irradiation so as to reduce the likelihood of exposure to airborne or other contaminants after the sterilization process.

The present invention provides cost-effective irradiation dosimeter systems and dosimeter sensors that can be employed in a mass production environment. The systems and sensors can be used to quantify or evaluate radiation exposure or doses for items which have been electronically pasteurized to prepare and process uncooked and frozen commercial sized and/or bulk food items for safer consumption. The system can also be used to monitor irradiation delivered to inhibit the decay of food items conventionally introduced by microorganisms living therein, thereby reducing the amount of food which conventionally has been unable to be sold due to undesirable decay and/or spoilage. The system reduces inspection labor requirements (eliminating the requirement of visual inspection or physical intervention to determine the dose) and can improve the reliability of the production process itself by providing radiation dose information on a substantially real-time basis to allow faster adjustment of process parameters. The system can be used in cold environments (where food is refrigerated or frozen), ambient, and hot (where food is cooked) environments.

The foregoing and other objects and aspects of the present invention are explained in detail in the specification set forth below.

BRIEF DESCRIPTION OF THE DRAWINGS

FIG. 1B is a table listing foods approved by the US Food and Drug Administration ("FDA") for irradiation in the United States and their corresponding maximum doses.

FIG. 5A is a schematic diagram of a dosimeter sensor circuit according to one embodiment of the present invention.

FIGS. 5C and 5D are graphs of a response signal, FIG. 5A illustrating the signal below the threshold voltage and FIG. 5B illustrating the waveform affected by the activation of the device (at values above the threshold voltage).

FIGS. 8A and 8B are graphs that illustrate a simulated sensor response to various radiation dose levels according to the present invention.

FIG. 18A represents the power delivered by the primary circuit to the secondary (ID tag) circuit. FIG. 18B is the waveform of the power oscillator voltage signal. FIG. 18C is a waveform associated with the voltage across the capacitor C1.

FIGS. 21A–12C are graphs of waveforms of simulation results over time for the circuit shown in FIG. 20. FIG. 21A is a graph of the primary power and the sensed signal over time. FIG. 21B illustrates the primary voltage from the controlled oscillator (E19 in FIG. 20) over time. FIG. 21C illustrates the capacitive voltage (C19C in FIG. 20) over time; the top curve representing an Hfe of 10, the middle curve representing an Hfe of 20, and the bottom curve an Hfe of 80.

FIG. 24A illustrates the rectified average primary current in the circuit of L19A/C19A in FIG. 23 over time. FIG. 24B illustrates the C19C voltage over time. FIG. 24C illustrates the E19 voltage over time.

FIG. 27 is a circuit diagram of a full-bridge diode dosimeter according to embodiments of the present invention.

FIG. 28 is a schematic illustration showing components associated with a dosimeter tag according to embodiments of the present invention.

DESCRIPTION OF EMBODIMENTS OF THE INVENTION

Figure 1A:
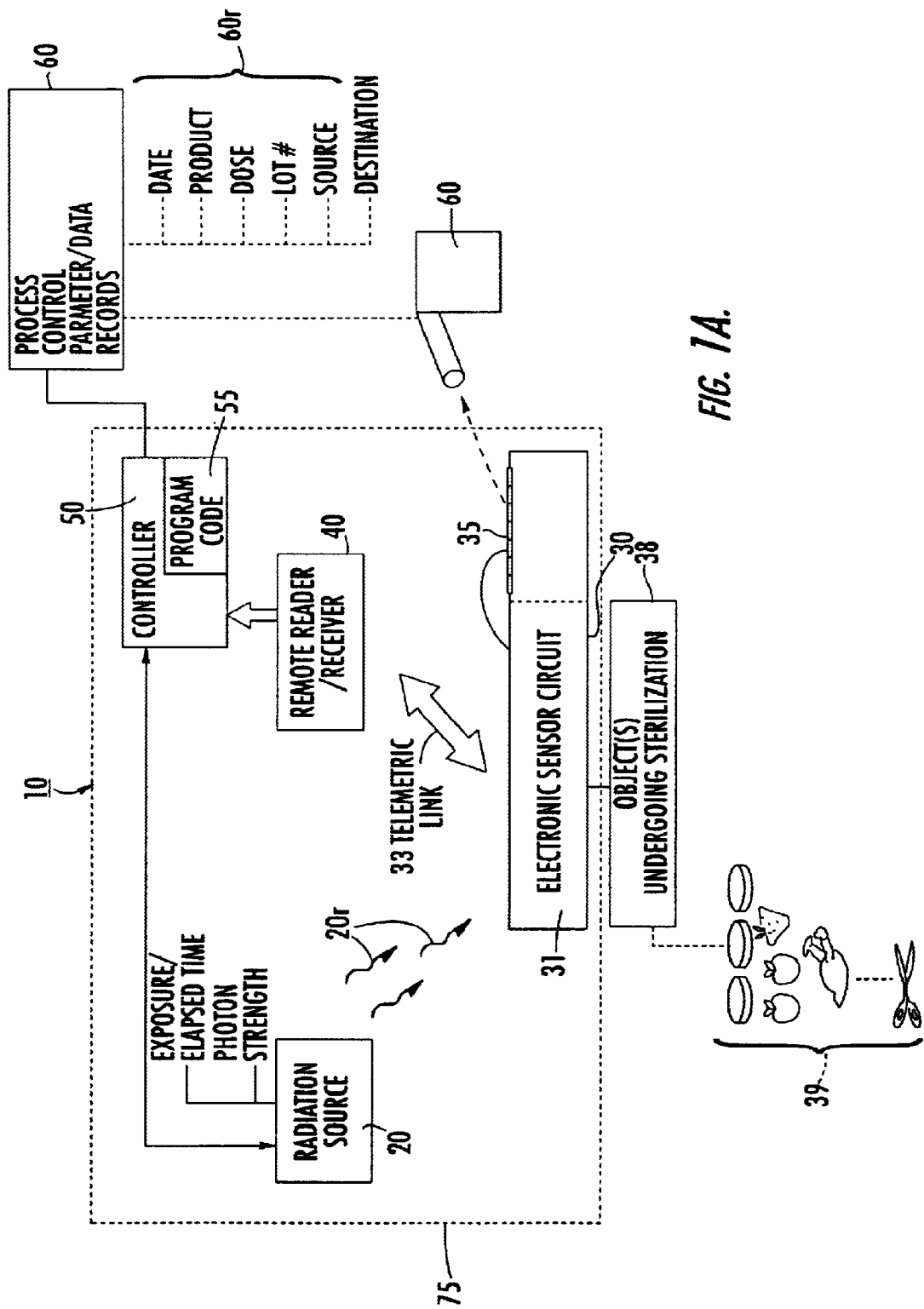
FIG. 1A is a schematic illustration of a radiation measurement system according to the present invention.

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. In the figures, layers, regions, or components may be exaggerated for clarity.

Generally described, the present invention provides economical systems, computer products, and methods to estimate, determine, measure, and/or quantify radiation exposure by and/or the amount of radiation which is transmitted to an object (or a plurality of objects) in situ by detecting a change in a selected electronic parameter(s). The value of the change in the selected parameter may be wirelessly or telemetrically relayed to a remote or proximate reader/receiver. The reader can input the data associated with the parameter into a signal processor, controller or computer, which can calculate a corresponding radiation dose. The radiation dose measurement can be easily input (uploaded or downloaded automatically) into an electronic process control data record which can be searched and provide regulatory documentation associated with the food item and/or the production lot. In certain embodiments, the system is configured to measure the radiation dose on the object in situ by activating a passively operated electronic sensing circuit disposed proximate to the object or product via an inductively coupled telemetric or wireless reader and monitoring a selected electronic parameter associated with the electronic sensing circuit.

The systems of the present invention may be configured to operate without requiring labor-intensive efforts by operating personnel to measure the radiation dose as it is delivered to the irradiated product or object (such as foodstuffs). In certain embodiments, the system is configured to operate substantially automatically to quantify and record the radiation dose in an electronic database without requiring direct human manipulation of the irradiated product to determine an associated radiation dose. The system can be configured to operate in ambient and hot and cold environments (i.e., environments associated with the cooking temperatures of foods, or refrigerated or freezer temperatures used to process foods).

The methods and systems of the present invention are particularly suited for electronic pasteurization to measure radiation doses delivered to packaged, and preferably, sealed, food items undergoing radiation-based sterilization. As used herein, the term "electronic pasteurization" and/or "sterilize" means to irradiate to a level sufficient to meet or exceed minimum regulatory guidelines for identified undesirable microorganisms or food borne microbes.

The food items may be irradiated to provide an increased shelf life over non-electronic pasteurized counterparts while staying at or below the maximum irradiation level mandated by the appropriate regulatory agency. The food may be irradiated to produce a reduction in identified pathogens including one or more of Salmonella, Listera, Tosoplasma, Campylobacter, Norwalk-like viruses, and $E$-$coli$ 0157:H7 over non-treated samples or foodstuffs as determined using conventional or standard techniques known in the art.

In one embodiment, "fresh" uncooked food items are electronically sterilized so as to destroy or reduce microorganisms sufficiently to provide an extended non-refrigerated shelf-life or refrigerated shelf-life (preferably providing a shelf-life which is at least one week, and preferably, 2 weeks–4 weeks, or 4 weeks or more) over corresponding non-sterilized foods as determined using conventional or standard techniques known in the art.

Examples of food items suitable for radiation-based sterilization or "electronic pasteurization" include, but are not limited to, meats including frozen and/or unfrozen uncooked or cooked meats such as poultry, fish, beef and pork, and "fresh" fruits and vegetables, particularly those which are at increased risk of decay and a limited shelf life, including strawberries, blueberries, raspberries, peaches, grapes, tomatoes, zucchini, squash, lettuce, cabbage, broccoli, cauliflower, corn, green beans, egg plant, and the like. Other perishable food items (typically limited shelf-life products) such as baked goods, mushrooms, spices (such as gingerroot, and basil), and the like or candy may also be suitable for radiation-based sterilization. In addition, other food items suitable for such treatment includes pet foods, grains, wheat and corn flour. FIG. 1B is a table of the list of foods approved for irradiation in the United States along with the FDA recommended maximum doses. The list of foods and/or the radiation levels are subject to change over time, and may vary in different countries; as such, this list is not intended to be limiting to the present invention.

Figure 7A:
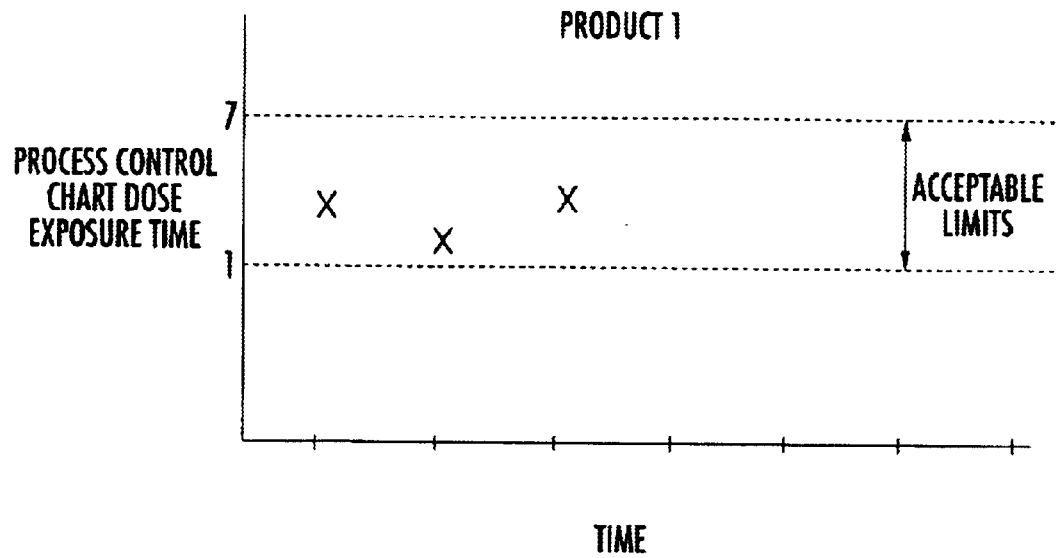
FIGS. 7A and 7B are process control graphs which can be used to monitor the radiation process over a period of time according to the present invention.
Figure 7B:
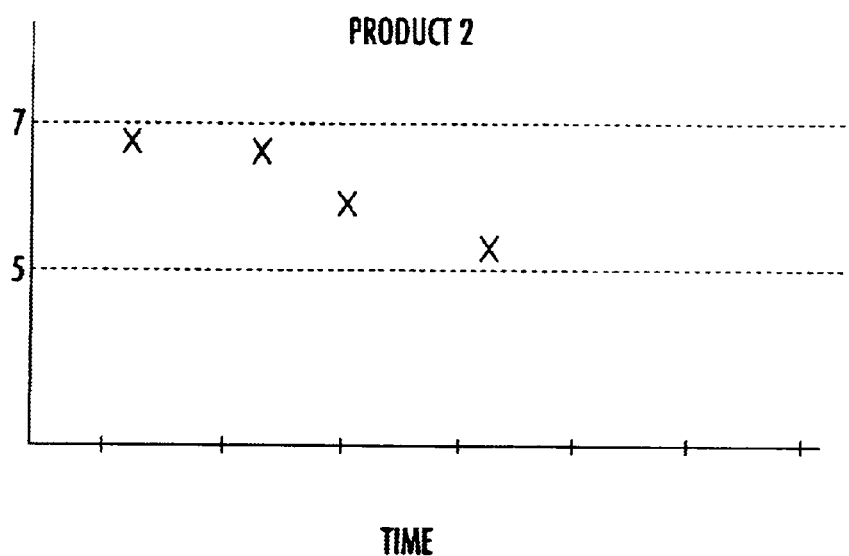

The system can be configured to measure a radiation dose for each product or with each package, or, alternatively, on one or more selected specimens or groups of products within a production lot or production run (one machine set-up and/or one shift), or at other desired processing intervals. If the measurement is selectively performed (as opposed to being performed on each item or product or on each packaged grouping), it is preferred that the specimen or product be selected so that it can provide a statistically relevant inspection data point(s) representative of other specimens in each production lot. FIGS. 7A and 7B illustrate automated process control charts than can be generated to track exposure time and doses for a particular product or system over time. The system can be configured to generate an audible alert whenever the process range departs acceptable deviations to allow the process-input parameters to be adjusted.

Turning now to FIG. 1A, a monitoring system 10 for a radiation-based sterilization process is shown. The system 10 is operably associated with a radiation source 20 and includes a radiation sensor 30 comprising a sensor circuit 31. In operation, the radiation sensor 30 is positioned adjacent and/or in contact with an object 38 undergoing sterilization. Alternatively, the sensor 30 can be disposed on an external or internal portion of the associated packaging of the object 38 (either on the cover, backing, or container portion of the packaging) or at other locations proximate to the object(s) or containers thereof. FIG. 1A also illustrates examples of foodstuff and medical tools (beef or hamburger patties (frozen or unfrozen or cooked or uncooked), apples, strawberries, poultry, and scissors (representing medical implements, devices, tools or other medical-use items)) which can be sterilized by radiation-based processes as described above (designated in this figure as element 39).

As shown, the system 10 also includes a remote or wireless reader 40 which is positioned in the system 10 such that it can activate the sensor 30 via a telemetric link 33. The system 10 also includes a controller 50 configured with a computer program or algorithm which is configured to process relayed data associated with the sensor 30 and then determine or calculate the radiation dose based on the input of the relayed data.

Figure 4:
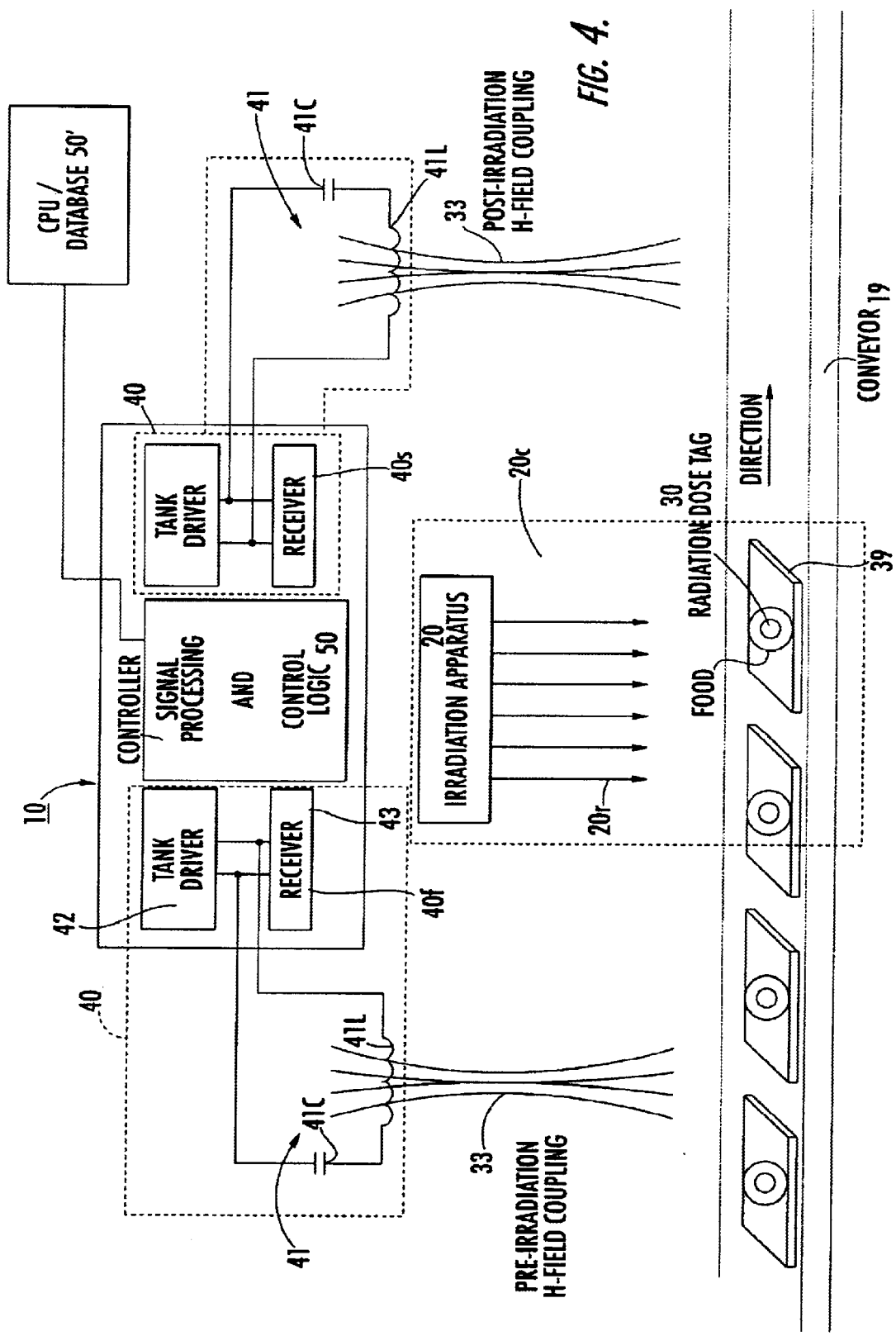
FIG. 4 is a schematic diagram of an irradiation monitoring system according to the present invention.

Preferably, the reader 40 is positioned to reduce its exposure to radiation (such as appropriately shielded or disposed external of a batch or conveying line). As shown, the wireless telemetric link 33 and the reader 40 can be electrically coupled to the passive sensor 30 through an "H field" coupling as shown in FIG. 4. If a reading is desired during active irradiation, a ceramic insulated coaxial wire can be used to provide the electrical connection (not shown), one end positioned proximate the sensor 30 in the radiation chamber and the other end operably associated with the external reader 40.

Alternatively, a radiation reading can be obtained by obtaining information about the sensor both before and after active irradiation (not requiring wiring in the radiation chamber 20c as shown in FIG. 4. Of course, the "before reading" can be either provided by one or more of an in situ measurement obtained prior to irradiation and/or can be a test or manufacturer provided value, which can be electronically input into the control system, as will be discussed further below.

Figure 2:
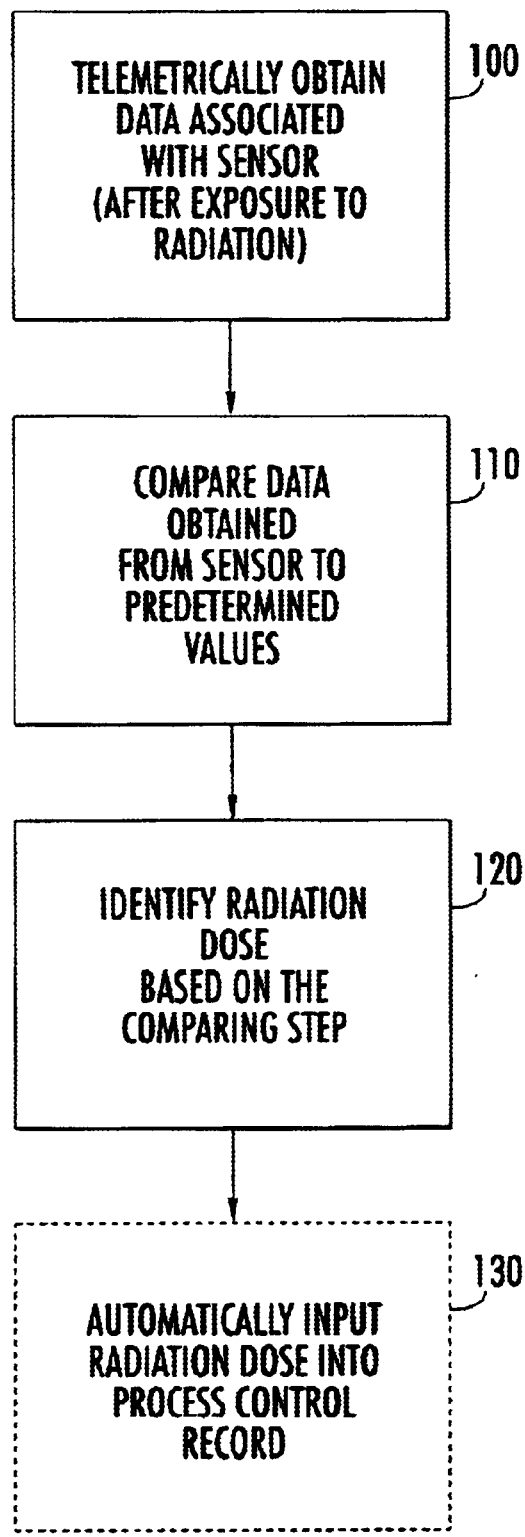
FIG. 2 is a flow chart of operations that can be used to assess radiation doses according to embodiments of the present invention.

As shown in FIG. 2, in operation, data associated with the sensor 30 is obtained telemetrically (Block 100). The data associated with the sensor 30 (representative of one or more selected parameters thereof) can be obtained at various points during irradiation or at the conclusion of the irradiation. The data is then compared to predetermined values corresponding the value(s) to an associated radiation level(s) (Block 110). The predetermined values can be one or more initial (pre-radiation) values taken in situ of the sensor, itself, or pre-radiation values associated with a particular production lot of the sensor being used. The initial (pre-radiation) values can be used to monitor shifts in parameters associated with the sensor or in the operation of the sensor (as will be discussed further below). The shifts in the monitored parameter(s) are, in turn, correlated to the amount of radiation to which the sensor, and hence, the object, is exposed. Alternatively, or additionally, the predetermined values can be experimentally or mathematically derived values associated with a predictable response of the sensor as it is exposed to various radiation levels (typically within a selected radiation range) for one or more selected parameters. These derived values can be determined and included as a computer readable "look-up" chart loaded into the controller by the OEM.

The information can be provided in an initial set-up of the system, or for each type or each production lot of sensors. Again, the information can be configured in a downloadable electronic format, allowing the controller 50 to correlate the radiation exposure or dose based on the actual value(s) of the data correlated to the radiation dose needed to achieve such a value. Thus, the radiation dose of the object is identified based on the comparison with either initially measured values (i.e., shift in the pre-radiation and post-radiation data) or with predictable response values for various radiation levels (Block 120). The predictable response values may be dependent on the type of radiation system employed. As shown, the measured or determined radiation dose can then optionally be automatically electronically entered into an electronic database associated with the process control record of the product or the production lot (Block 130).

Figure 15:
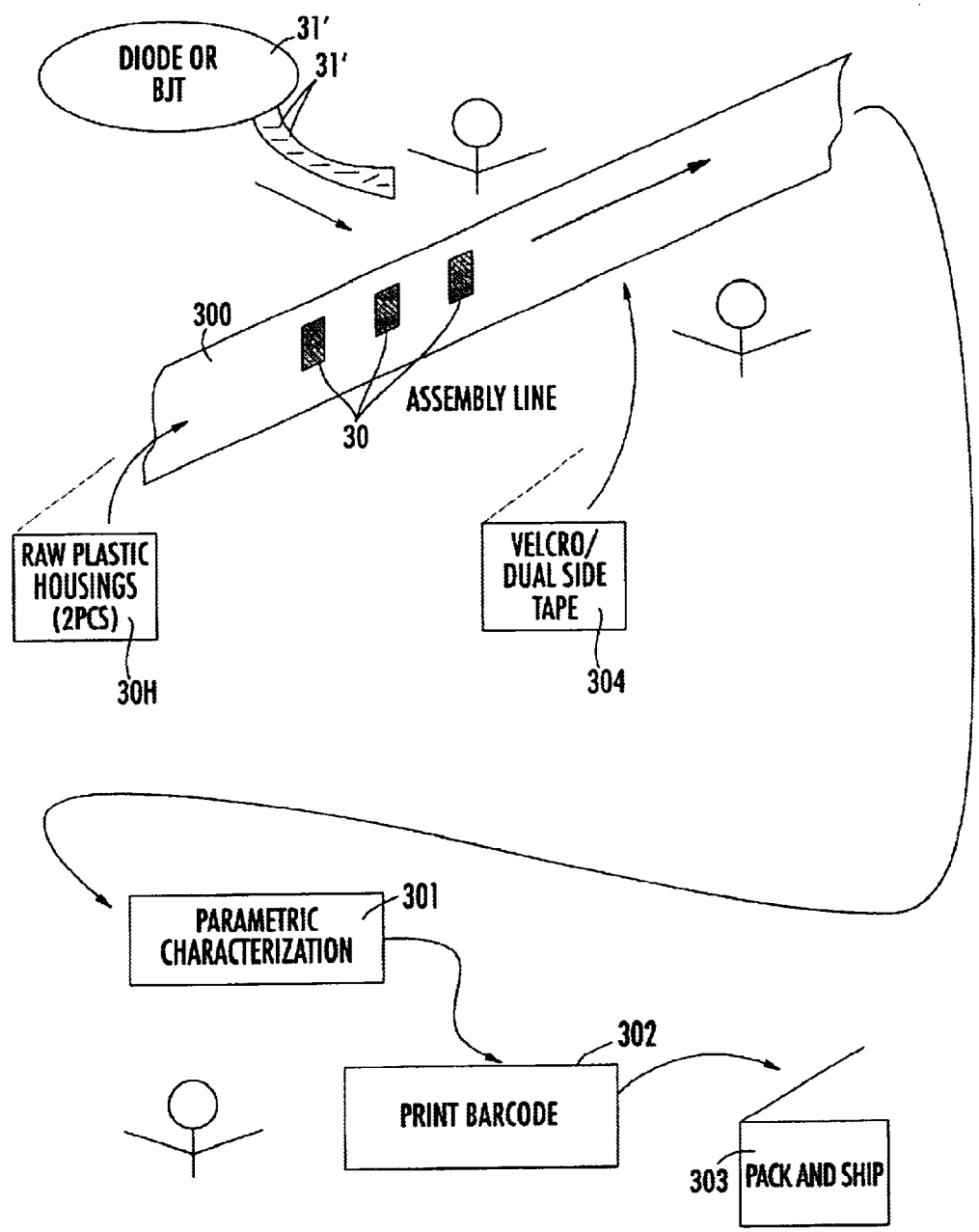
FIG. 15 is a schematic illustration of a method for determining and identifying parametric (pre-radiation) characterization of dosimeter tags according to embodiments of the present invention.

Alternatively, as shown in FIG. 15, each radiation sensor 30 can be individually evaluated for pre-irradiation parametric characterization in a mass production environment. In certain embodiments, a sensor housing, such as a two-piece lockable housing, can be introduced onto an assembly line. The housing 30H can be configured from plastic or other elastomeric or inexpensive material to sandwich and/ or mate together to hold circuit components which form the sensor 30. The housing 30H can be configured as a substantially rectangular shape so as to facilitate orientation/ alignment for measurement or evaluation in an automated (machine based) manner. As shown, the housings 30H can be serially fed onto a conveyor 300. A continuous supply of components 31' which are used as the active sensor circuits 31 can be fed to meet with the sensor housings 30H to form the sensors 30 as they meet along the conveyor or assembly line. As shown, in certain embodiments the components 31' can include a diode, bipolar transistor, MOSFET, or other suitable electronic or active component. For examples of sensor circuits 31 using diodes, see FIGS. 23 and 27, and for examples of sensor circuits using bipolar transistors, see FIGS. 17, 19, 20, 22, and 25.

Figure 14:
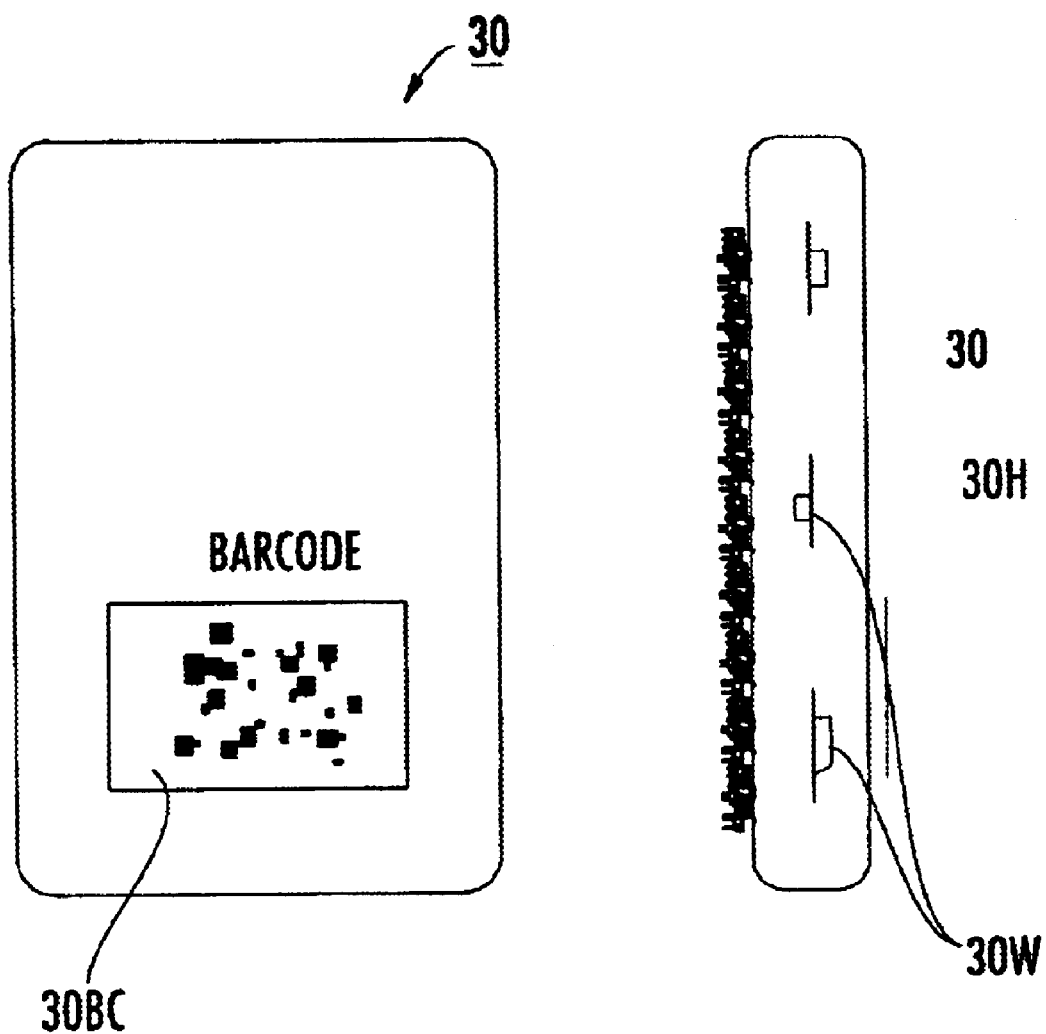
FIG. 14 is a diagram of a dosimetry tag according to embodiments of the present invention.

As shown in FIG. 14, leads 30w of the circuit 31 or a selected component thereof can be configured so as to be accessible for external stimulation during the parametric characterization. As shown, the leads 30w extend out a length from the housing 30H. Referring again to FIG. 15, the sensors (which, in some embodiments may be descriptively termed "dosimeter tags") are then evaluated for parametric characterization (301) or pre-irradiation response values of one or more desired parameters of the sensor circuit 31. This information can then be formatted into a bar code (302) which can be printed onto or attached as a label to the sensor 30. The sensors 30 can then be packaged and shipped (303) to irradiation facilities. FIG. 14 illustrates the sensor 30 with the bar code 30BC. As shown, the bar code is a label which is attached via an adhesive, VELCRO, double sided tape, or other desired attachment means. The attachment means operation (304) is shown in FIG. 15 as being applied to the sensor 30 prior to the label print out (302).

In certain embodiments, an external attachment means (304) can be applied to the sensor 30 prior to the parameter characterization (301). The attachment means can be used to attach the sensor 30 itself to the food items themselves or on packages or cartons of food items 38 undergoing radiation at the irradiation facility (see, e.g., FIG. 15, block 305). The bar code label 30BC may have its own adhesive backing and can be attached to the sensor 30 after the parametric characterization (typically before shipping shown in FIG. 15 at block 303).

Figure 16:
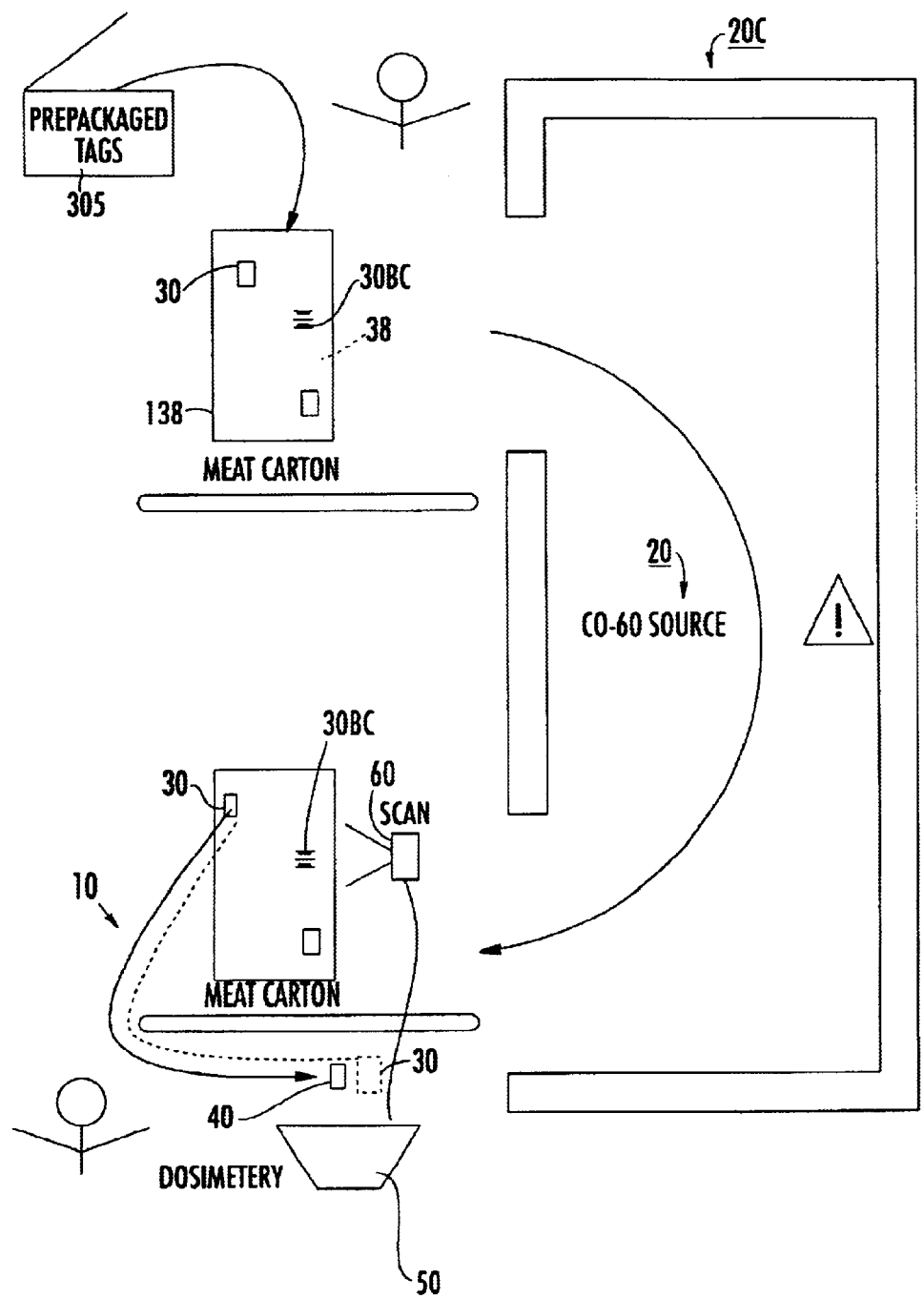
FIG. 16 is a schematic illustration of a process flow at an irradiation facility according to embodiments of the present invention.

FIG. 16 illustrates that the prepackaged radiation sensors or tags 30 can be applied to packages or cartons of food items 38 undergoing radiation. As shown, the bar code label 30BC may be separated from the sensor 30 and positioned at a different (externally readable) location on the item 38 or on the container or package 138, as desired. In other embodiments, the bar code label may remain with the sensor 30 (tag or package). The bar code label may include additional data, beyond just the parametric data, useful to the irradiation facility as described above.

After the product is irradiated by a radiation source 20 in the radiation chamber 20C, it is evaluated by the electronic pasteurization or sterilization (dosimeter evaluation) monitoring system 10. As shown, the bar code data with the parametric characterization information can be read and obtained via an optical scanner or reader 60 to scan the bar code 30BC while the reader or primary circuit 40 activates the sensor 30 and the information is correlated in the controller 50 to determine dose. Alternatively, as shown by the broken line, the sensor 30 can be removed from the package (either manually or in an automated manner) and a direct (electrical) contact reading can be used to obtain a dosimeter measurement. These operations may be performed sequentially or serially.

In certain embodiments, as shown in FIG. 1A, the radiation dose is input as an electronic data record into a desired process or product history database used to hold process control records 60. This database can be configured to receive, collect, and/or correlate important or desired information about the product (examples of such information are designated in the figure as 60r), including the processing (packaging/irradiation) date, the measured or detected radiation dose, the production lot number, the incoming vendor or source of the food or other item, and the distributor or outlet destination.

In certain embodiments, the sensor 30 is configured with information 35 which can be electronically relayed or scanned and input into the process record. Optionally, as shown by dotted line in FIG. 1A, the data or information provided by the sensor 30 is configured in a bar code label or computer readable format, which can be input into the database after it is read by an opto-electronic reader or scanner 60 or input device well known to those of skill in the art. As such, the sensor 30 can include one or more of sensor product identification, serial number, date of manufacture, and manufacturer or vendor, as well as an assigned production lot number or serial number for tracking the processed product itself, as well as the parametric characterization information, as desired, each potentially allowing for easier identification of products needed to be recalled or tracked for process control and/or inventory tracking of the product. In addition, or alternatively, the "tracking" device can be an RFID tag as is well known in the art. Preferably, for radiation-sensitive devices which are used to hold the production history or selected process (electronically accessible) information, the device is either shielded during radiation to maintain the integrity of the data or the device is accessed and read (and input into the system records) prior to irradiation as the radiation exposure may destroy the functionality of the device.

As is also shown in FIG. 1A, the controller 50 can be configured to control the activation period or exposure time of the radiation source 20. That is, the sensor 30, the controller 50, and the radiation source 20 can be configured to operate as a control system having a feedback loop 75. In operation, the sensor 30 transmits data responsive to inductive activation by a signal sent thereto from the remote wireless reader 40. The data transmitted is analyzed to correlate it with the quantity of radiation received by the sensor (and hence the irradiated object/food) at that point in time. The controller 50 processes the received or transmitted data and determines the level of radiation or radiation dose for the product 38. A computer readable look-up program or chart can be accessed identifying the process control limits for the appropriate radiation dose for this particular product (smaller and larger objects may have different preferred radiation levels). If the determined radiation dose is below the desired level, the radiation source continues in the operative mode to transmit radiation 20r and irradiate the object 38. These steps can be carried out at selective intervals, but are preferably performed to allow a substantially continual reading of the signal frequency.

Figure 3:
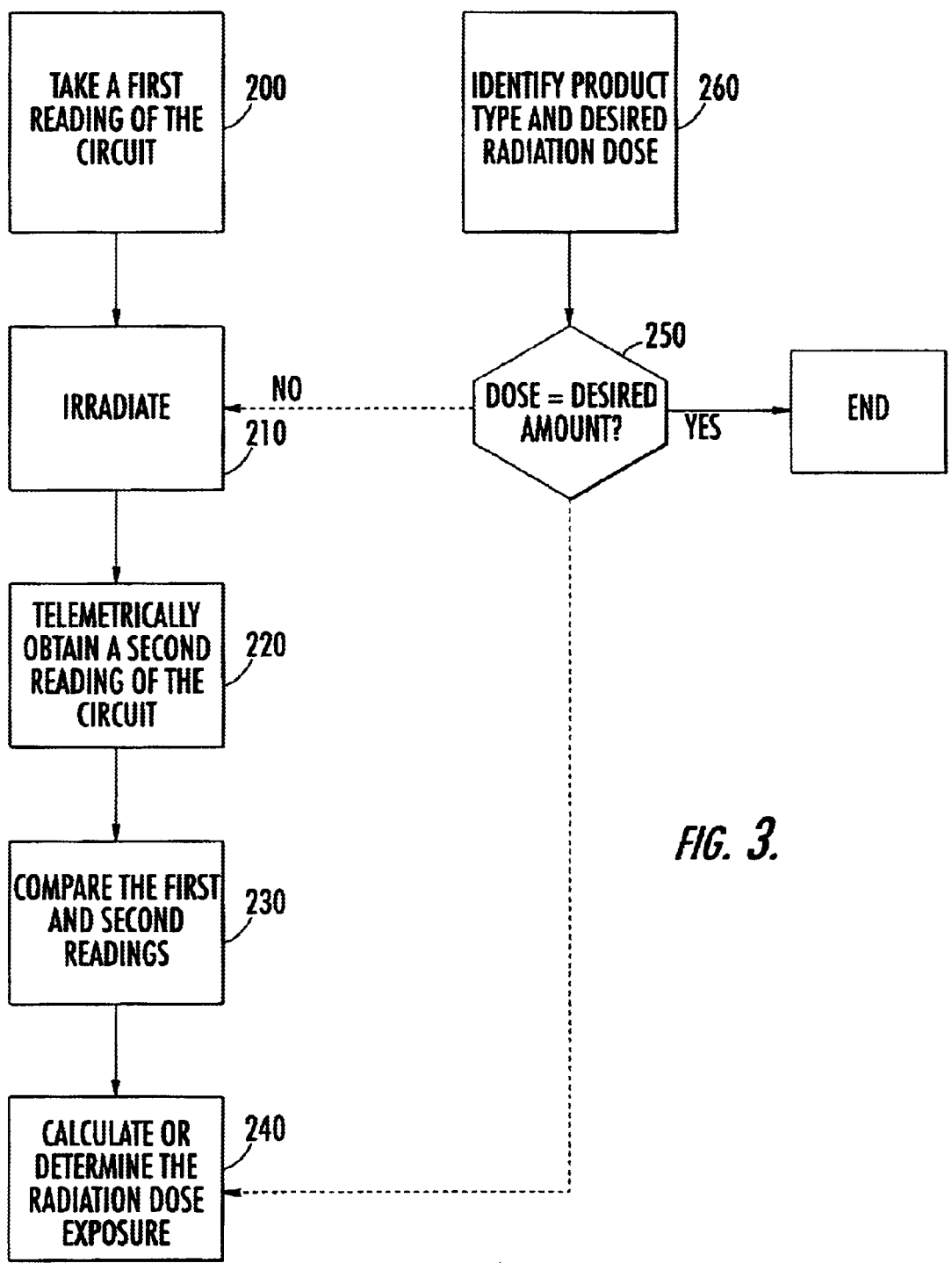
FIG. 3 is a flow chart of a method used to control the radiation dose according to embodiments of the present invention.

FIG. 3 illustrates the sequence of events for one embodiment of a method according to the present invention. The sensor 30 is positioned on or adjacent the object 38 undergoing sterilization. An initial or first pre-radiation reading of the sensor circuit 31 is obtained (Block 200). The reading can be obtained after the sensor 30 is positioned on or adjacent the object 38. Alternatively, the initial reading can be established remote from the radiation site (such as at a testing laboratory or OEM facility). The object 38 and sensor 30 are then irradiated (Block 210). A second reading of the circuit is then telemetrically obtained (Block 220). The first and second readings are compared (Block 230). The radiation dose is then calculated based on the comparing step (Block 240).

In certain embodiments, a plurality of readings can be obtained during active irradiation. These readings can be used to monitor radiation delivered and/or to allow an operator the ability to control the elapsed radiation period with dynamic information received during the actual delivery of the radiation. A metal antenna can be placed with the sample which can serve as the coil for the signal pick-up. Also, the monitoring system 10 can optionally be configured to compare one or more of the readings to a desired dose value correlated to a particular product (Block 260). In addition, a plurality of sensors 30 can be positioned on a large package of foodstuffs (such as spread about a pallet or bulk package) to allow assessment of multiple locations about the product (facilitating a more thorough evaluation for thicker, bulkier, or larger items). If the detected radiation dose is less than desired for the product undergoing radiation, the process can proceed (Block 250); however, if the radiation dose exceeds or meets the desired dose, the radiation source can be interrupted, preferably automatically, and the process ended. The "reading" of the circuit is based on one or more selected parameters that are altered in relation to the amount of radiation exposure, thereby allowing radiation dose to be quantified. As above, readings can be obtained at various points during irradiation or one or more readings can be obtained after the irradiation process has ended.

As shown in FIG. 4, the electronic pasteurization or sterilization monitoring system 10 is operably associated with a conveyor-based 19 irradiation delivery system. As shown, the monitoring system 10 includes a first reader 40f and a second reader 40s, each providing a telemetric link 33 (shown as an "H-field" coupling). The first reader 40f is positioned to take a signal reading before the radiation chamber 20c and the second reader is positioned to take a signal reading after the radiation chamber 20c. In operation, the two readings can be compared and a radiation exposure dose determined. As shown by the enclosed dotted line, in this embodiment, each reader 40 includes a resonant tank circuit 41 with an associated inductor and capacitor 41L, 41C, a tank driver 42, and a receiver 43. The readers 40 are each in communication with the controller 50 which includes the signal processing and control logic. The controller 50 can be operably associated with a remote or local CPU or other computer 50'.

The system 10 can include a dynamic visual QC (quality control) feedback such as a red light/green light which can be activated and displayed, the green light indicating that the radiation dose is confirmed as in the desired range (not shown). Alternatively, or in addition thereto, the system 10 can be configured with an audio alert (not shown) which is generated when the radiation dose is determined to be outside a predefined range (which may vary for the type of object or food type undergoing irradiation). The audio alert may allow for timely adjustment of the process (slowing or speeding the conveyor speed to adjust the residence time, or otherwise adjust the process parameters) while potentially reducing the amount of discrepant product produced.

Turning now to the sensor 30 itself, the present invention employs an electronic circuit 31 which is influenced by irradiation. That is, the electronic circuit 31 is configured such that it predictably alters its behavior responsive to a particular radiation exposure range. The system 10 and/or the sensor 30 can be selectively configured to irradiate predefined items thereby allowing customization of the system or the system for each plant or processing facility. For example, for irradiation systems which process poultry or chicken, the system 10 and the sensor can be configured to detect doses corresponding to the FDA guidelines (the maximum is for chicken is presently set at 3 kGy, see FIG. 1B) about the 1–5 kGy range (to quantify the doses which are above and below the maximum level).

Alternatively, the system 10 can be configured to operate across a variety of irradiation doses and/or with sensors 30 which also operate across a wide variety of applications and corresponding doses. For food, the sensor 30 is configured to operate predictably in a radiation range of from about 0.1–10 kGy, and more preferably, for meats, from about 1–5 or 1–7 kGy. For spices, herbs, animal foods and the like the system is preferably configured to operate predictably up to at least about 31 kGy (slightly above the FDA maximum dose range). For non-edible items such as medical devices, tools, and implements, the sensor 30, is preferably configured to operate at increased radiation exposures, such as up to about 10–75 kGy, and typically at about 20–50 kGy. More preferably, the sensor 30 is configured to operate over a broad range of radiation doses to allow for use with multiple food products (i.e., from 1–10 kGy, 0.1–10 kGy, 0.5–5 kGy, 2–4 kGy, 1–5 kGy, and the like).

In operation, when exposed to radiation, one or more electrical parameters associated with the circuit 31 will alter or change depending on the amount of radiation exposure the electronic circuit 31 receives. In certain embodiments, the electronic circuit 31 is configured such that it is passively activated and cost effective, even when used in a mass production environment, i.e., low cost and disposable after a single use.

Examples of parameters suitable for correlating to radiation dose in the electronic circuit 31, include, but are not limited to, threshold voltage (shift) in MOS devices, voltage or electrical current characteristics in certain circuits, operational variants caused by defect creations introduced by irradiation-based destruction of the material layers in semiconductors, resonant frequency, frequency spectrum analysis of the signal of a circuit, conductivity of the dielectric material, the Q factor of the circuit (defined below), capacitance (or apparent capacitance) and/or resistance such as in the tank circuit, dielectric constant of the dielectric material in the tank circuit, the Hfe or $\beta$ of a bipolar transistor, leakage current in a diode, the coupling factor "K" and the like, according to various embodiments of the present invention. In operation, the selected parameter will present a detectable and predictable, computatable or correlatable altered state or value from a "before" radiation value and to an "after" (or during) radiation value(s).

Figure 5B:
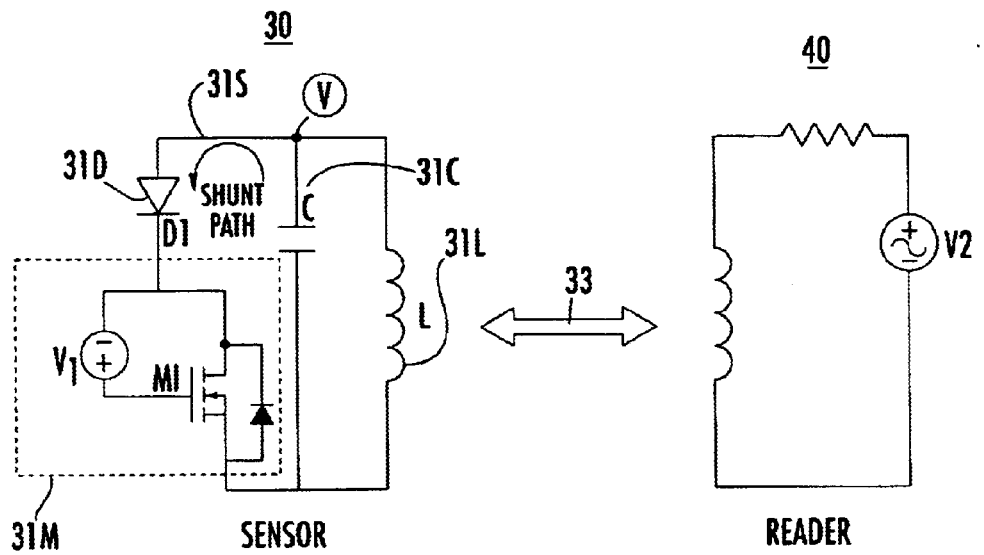
FIG. 5B is a schematic diagram of the circuit shown in FIG. 5A illustrating the operation of the MOS device with a voltage source used to model the radiation effect.

FIG. 5A illustrates one embodiment of the electronic sensor circuit 31. As shown, the electronic circuit 31 comprises a "tank" resonant circuit. In this embodiment, the tank circuit comprises an inductive element 31L, a capacitive element 31C, and a MOS device 31M. The circuit 31 can also include a diode 31D. As shown, the circuit 31 includes a shunt path 31s which directs current away from the electrical path with the capacitor 31C when the voltage is above the threshold voltage level of the MOS device 31M. FIG. 5B schematically illustrates this function. Thus, in this embodiment, a MOS or MOSFET device 31M can be used to modify the properties of the tank LC tank circuit. The MOS or MOSFET can form or provide capacitance in a shunt circuit 31s because the capacitance of the MOSFET is a function of the applied voltage. Upon exposure to radiation, the dosimeter circuit 31 is configured such that the relationship between capacitance and applied voltage is altered.

Generally stated, in operation, the MOSFET response in the shunt circuit 31s operationally changes based on the amount of trapped charge introduced from the ionizing radiation source, which is created in the gate oxide of the device. That is, this trapped charge, can, within a desired radiation exposure range, alter the response of the circuit 31 to an applied voltage value. Thus, the response of the shunt circuit 31s before and after exposure to radiation (to an applied voltage) within the desired radiation exposure or operational range is such that the MOSFET output or response changes, which can be detected correlated to determine the radiation dose associated with the change in response. Depending on the radiation exposure operational range of the sensor 30, "rad hard" MOSFETS can be used to ensure that the damage threshold is in the desired dose range. As MOSFETS are generally small and inexpensive, they can be economically integrated into a radiation sensor 30.

Figure 5E:
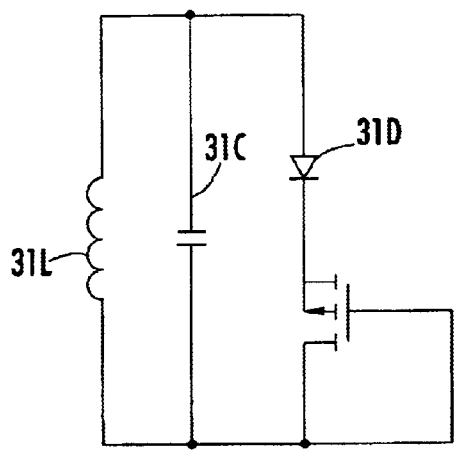
FIGS. 5E and 5F are schematic diagrams of alternate embodiments of a dosimeter sensor circuit according to the present invention.
Figure 5F:
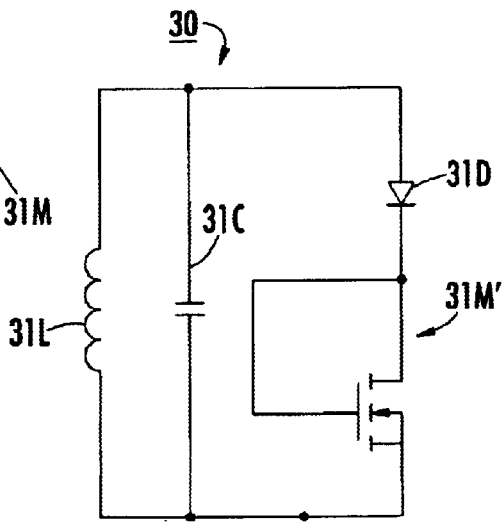

As shown, in FIG. 5B, an increase in V1 models the drop in MOSFET threshold voltage associated with radiation exposure to the sensor circuit. Thus, when the voltage shown as "V1" is applied to the circuit 31 (representing a level above the threshold voltage of the device 31M), electrical current is directed away from the first leg of the path and into the shunt path 31s (the shunt current). As the V1 voltage increases, more current is directed into the shunt path 31s. The current directed into the shunt path 31s acts to clip the shape of the response or reflected signal or waveform, which, in its purest form, is a sinusoidal wave, but as the shunt current increases, is a clipped waveform. FIGS. 5C and 5D illustrate the waveform change. The system 10 can increase or decrease the applied voltage until the threshold voltage is substantially approached according to known sampling and statistical computation techniques. FIGS. 5E and 5F illustrate that the MOSFET embodiment can be provided as either a P-channel (FIG. 5E) or an N-channel (FIG. 5F) type device, 31M, 31M', respectively.

Thus, in this embodiment, the tank circuit 31 is excited and the reader 40 "listens" to or monitors the reflected resonant signal. If the received signal is a high purity sine wave (a wave without substantial clipping of the top of the waveform), this means that the threshold voltage of the MOS device is above the peak voltage of the parallel resonant tank. If the resonant circuit signal is truncated or clipped, the voltage threshold, which is proportional to the magnetic field ("H-field") produced by the reader coil, can incrementally be decreased to determine the value.

Stated differently, during operation, an excitation pulse with a known voltage is transmitted to drive the circuit 31. The circuit then "rings down" in a damped fashion according to a known time constant. The amplitude or signal waveform can be monitored to define the level at which there is no (or substantially no) current traveling through the shunt 31s. This same measurement or monitoring can be performed on the exit side of the irradiation chamber 20c as shown in FIG. 4. The before threshold voltage can then be compared to the after radiation threshold voltage to determine the corresponding radiation dose (the dose level which produces this variation or shift). A correlation curve, equation, or look up table can be established to provide the correlation of radiation dose to shift values (separate curves may be established for each production lot or for a plurality of dose ranges of interest).

Figure 6A:
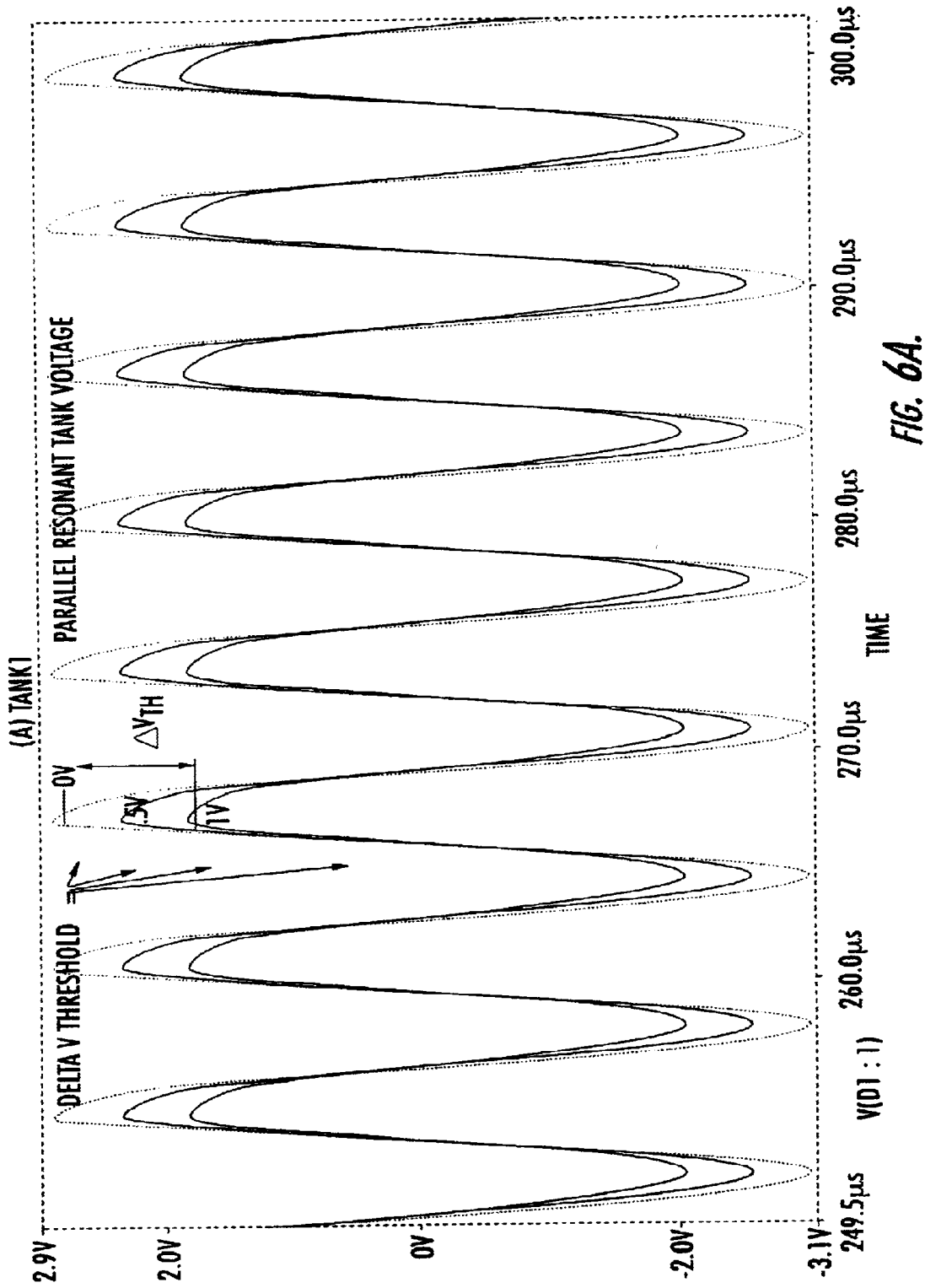
FIG. 6A is a graph of a tank circuit response signal illustrating the change in threshold voltage values determined by the signal peak shape.
Figure 6B:
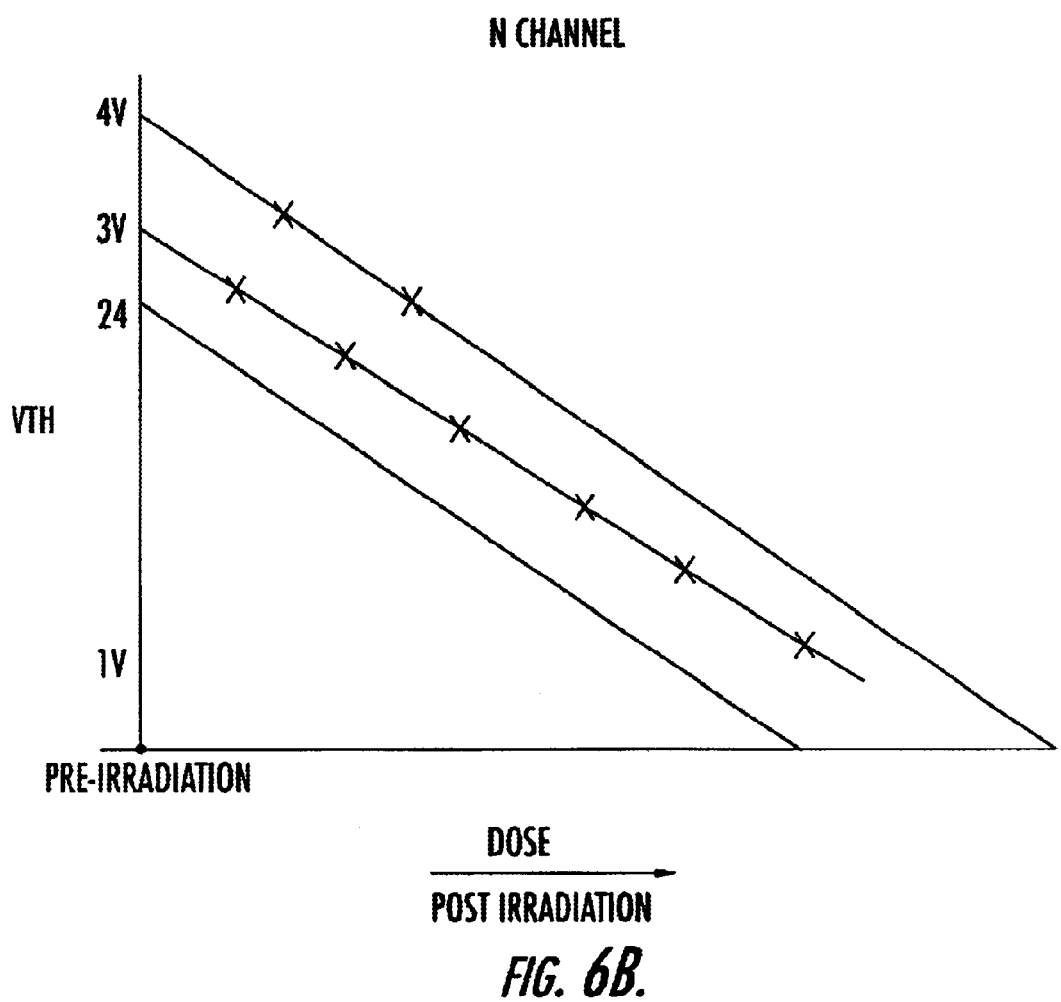
FIG. 6B is a graph of a simulated family of curves for an initial (pre-radiation) threshold voltage value (Vth) and the corresponding dose found by following the curve/line associated with the initial value to the altered threshold value.

FIG. 6A graphically illustrates a simulated change in voltage threshold values (representing the values before and after radiation). Thus, before radiation, a threshold voltage of about 2.8 v is indicated. "After" radiation the two waveforms shown thereunder illustrate the same waveform shape having a smaller amplitude signal corresponding to lower threshold voltage values (one at 0.5 volts below the first and the other at 1.0 volts below the first). Using a comparison of the change in voltage threshold values may provide improved reliability and consistency for dose determinations because most available dosimeters have a relatively large threshold voltage range (i.e., −1.0 v to +0.4 v). Alternatively, a family of dose correlation (bias) curves or relationships can be established for various initial threshold values as shown for exemplary purposes in FIG. 6B. Thus, for a sensor circuit 31 with a starting (pre-irradiation) voltage of 4 volts, one could (manually or electronically) compute the dose by matching the value of the post irradiation threshold voltage (or during irradiation) along the 4 volt curve or line to determine the appropriate dose on the bottom axis to quantify the corresponding exposure radiation dose.

Thus, monitoring when the clipped signal appears (or disappears), one can determine the value of the threshold voltage. As the MOS device 31M has a threshold voltage which is either known based on statistical inspection of a related production batch (such as values provided for each wafer batch) before irradiation or is quantified proximate in time to and before irradiation, a pre-irradiation threshold value can be established.

FIGS. 8a and 8B are plots of a simulated dosimeter or sensor circuit 31 response to various radiation dose levels. FIG. 8a illustrates the decreasing amplitude (threshold voltage) corresponding to the monitored response of the sensor circuit 31 correlated to radiation dose (represented in kGy). FIG. 8B illustrates the sensor circuit 31 voltage waveform for various irradiation levels (from 0–10 kGy). As shown, the "O" or pre-irradiation level is the largest amplitude waveform (close to 3.8 volts), with increasing exposures generating smaller amplitude waveforms.

The MOS device is preferably a RADFET configured to operate predictably with sufficient sensitivity in a desired dose range (preferably a range which extends above and below the maximum FDA value) for the particular food item or medical item undergoing evaluation. For example, for poultry a dose range of between about 1–4 kGy. One MOS device which may be suitable for meat applications is the 300/50 device 4 kÅ implanted gate oxide sold state dosimeter NMRC RADFET available from National Microelectronics Research Centre in Cork, Ireland.

It is expected that, by varying the density and/or percent material composition of the oxide/nitride layers, application or range specific MOS devices such as RADFETS can be produced which will provide the sensitivity, predictability or correlatable information in desired operative radiation ranges. For example, selecting the manner in which the oxide is grown, the addition of silicon nitride and the like are known ways to adjust the "rad-hardness" of the device (or the susceptibility of the device to radiation damage). Radiation can introduce a fixed charge that is trapped near the oxide/semiconductor interface, which causes a shift in the C-V characteristics of the MOS device (producing the threshold voltage shift discussed above). That is, semiconductors can be configured to exploit a number of interesting radiation effects to quantify radiation exposure. For example, the change in the trapped charge induced in the MOSFET structures. This can be a sensitive metric, which can be measured as an actual shift in "apparent" capacitance, or as described above, a shift in threshold voltage. At increased dose levels, conductivity can be affected (attributed to "defect" formation) which may be used for radiation quantification as well. Recombination times in the bulk can be shortened due to irradiation too. See Dienes et al., *Radiation Effects in Solids, Monographs in Physics and Astronomy*, Vol. II, Interscience Publishers, Inc.,© 1957. The contents of which are hereby incorporated by reference as if recited in full herein.

Figure 9A:
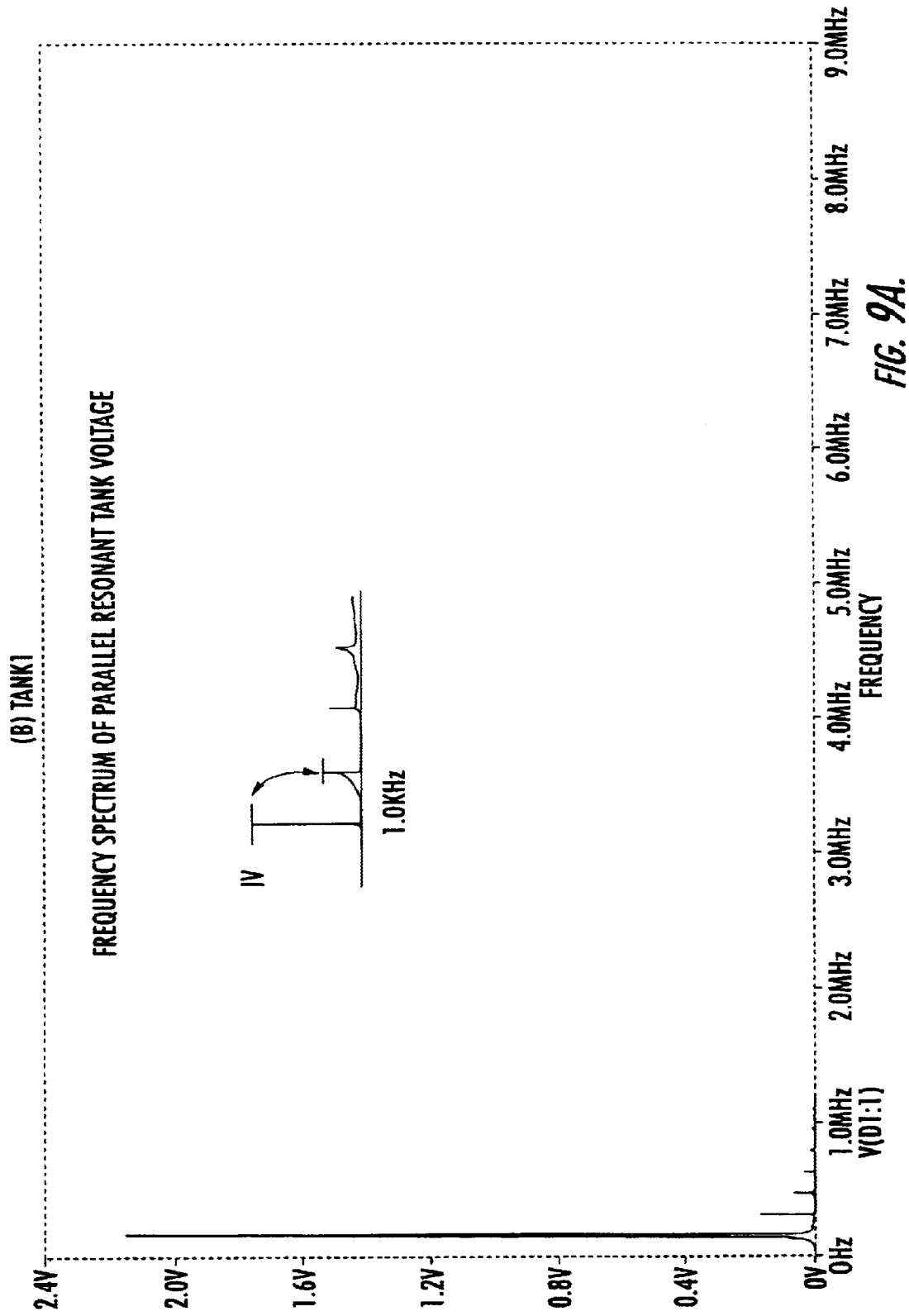
FIG. 9A is a graph of a frequency spectrum of the shunt path of a parallel resonant tank voltage illustrating the harmonics associated therewith (the fundamental is shown at 1 kHz). The frequency spectrum (or a portion thereof) can be used to determine the shift in threshold voltage upon exposure to radiation which can then be correlated to radiation dose according to one embodiment of the present invention.
Figure 9B:
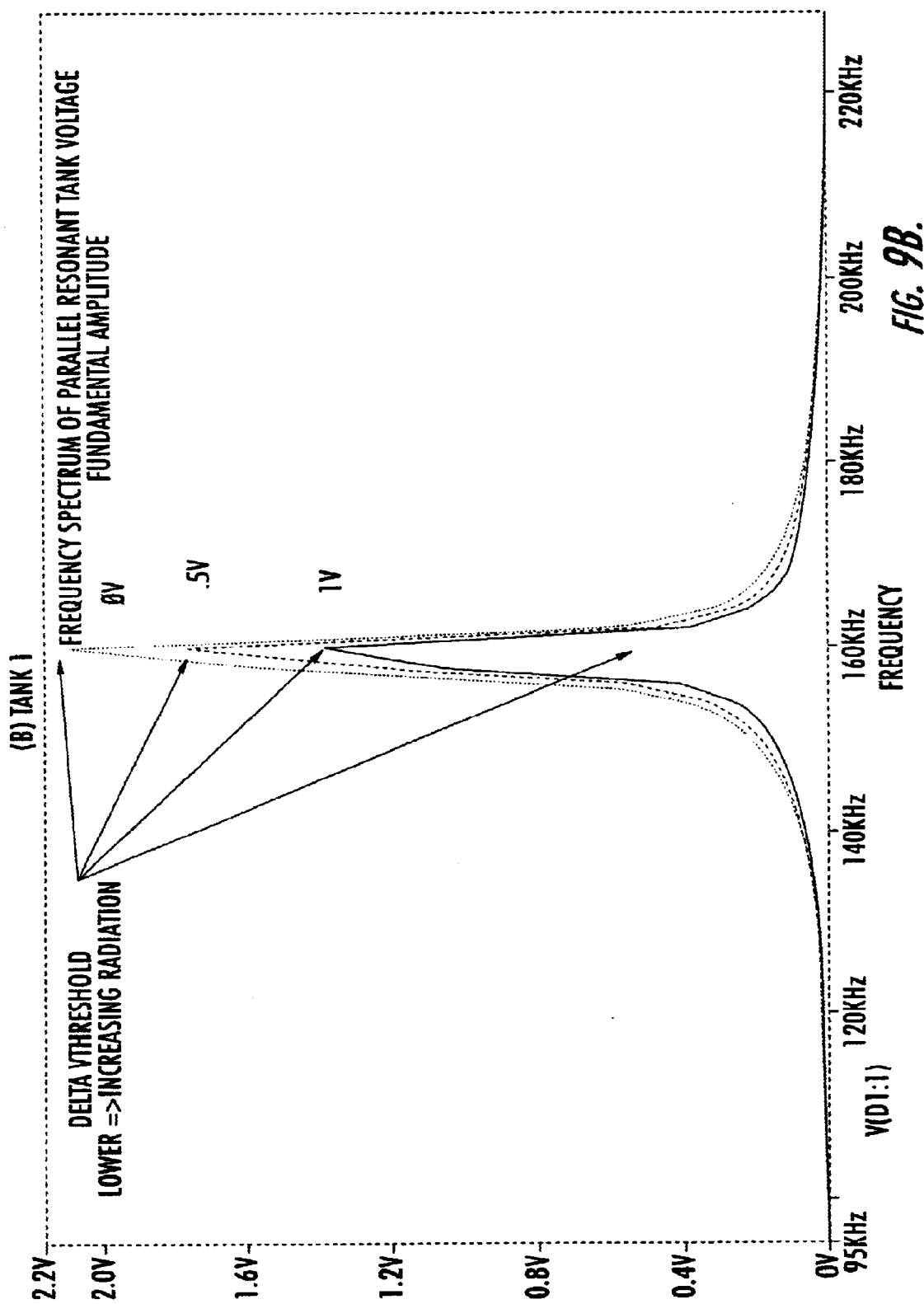
FIG. 9B is a simulated graph of the fundamental signal peak variation attributed to increasing radiation exposure levels (shown at 160 kHz). As shown, the delta (difference) between the threshold voltage levels associated with the amplitude increases with increasing radiation.
Figure 9C:
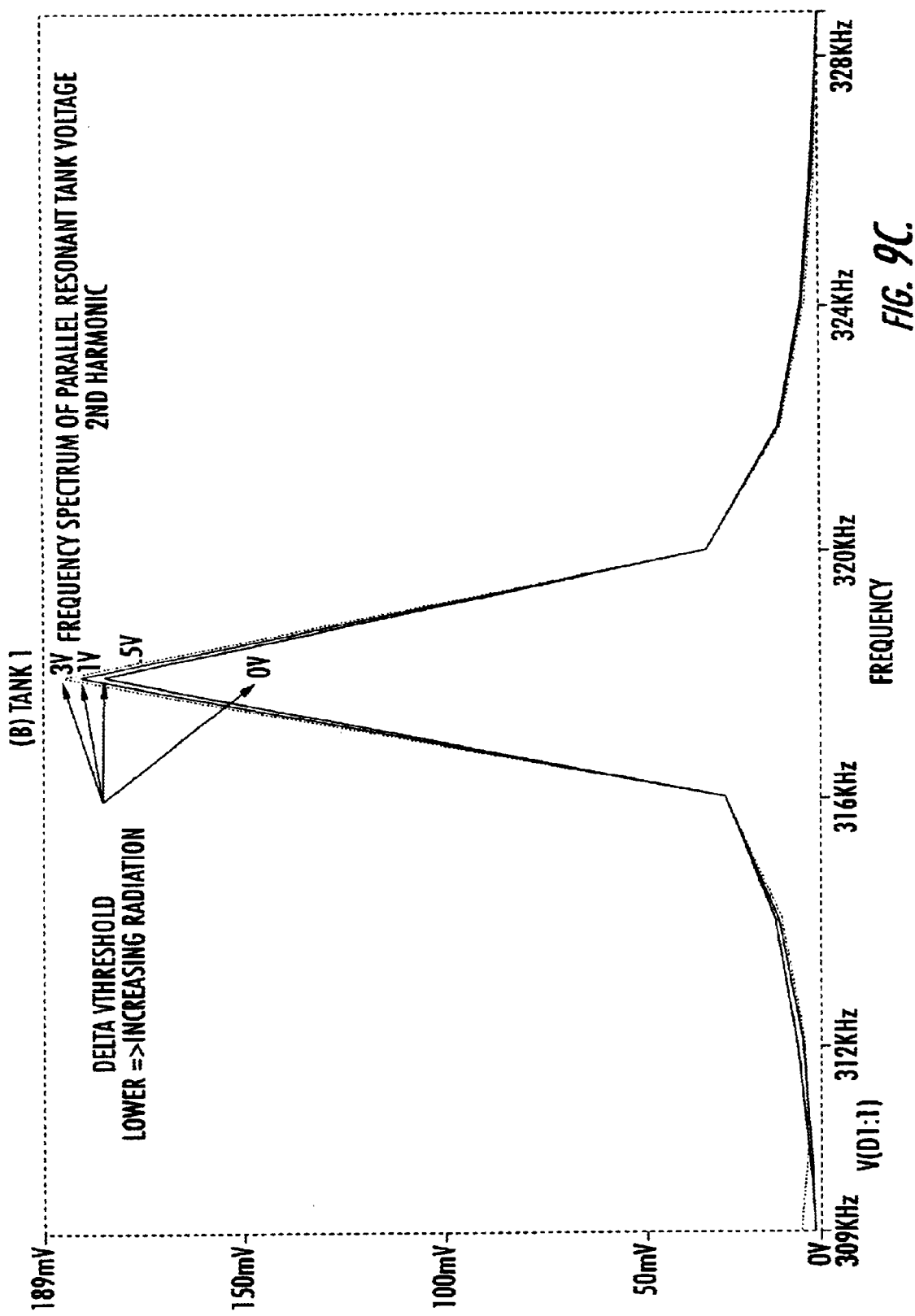
FIG. 9C is a graph of simulated responses of a harmonic of the frequency spectrum of a parallel resonant tank voltage, again showing that the delta (difference) between the pre-radiation value and irradiation exposed values, increases with increasing radiation exposure.

In one embodiment, as shown in FIGS. 9A–9C, one or more frequencies in a frequency plot can be generated and compared (before and after or during radiation) for the tank circuit. In so doing, the analysis can be carried out in the time domain, where the waveform can be digitized and the waveform amplitude measured and determined or, in the frequency domain, where a distortion analysis of the waveform can be performed to measure the distortion and quantify the radiation which caused the distortion.

As is known to those of skill in the art, the sensor 30 voltage signal reflected back to the receiver or reader 40 can be Fourier transformed. In this embodiment, the present invention uses a waveform analysis to determine the change in threshold voltage. If a pure sine wave is detected, a 1V peak at 1.0 kHz will be generated. However, if the shunt path 31s is activated and the waveform of the sensor tank circuit altered, various harmonic peaks will also appear, as shown in FIG. 9A. As shown, although a strong signal is shown at 1 kHz, several harmonic peaks (much smaller in amplitude) to the right of the primary or fundamental peak, also appear. The present invention recognizes that the fundamental peak is associated with the 31L–31C path of the tank circuit while the harmonics are associated with the shunt path 31s. Therefore, the harmonic evaluation or a waveform distortion analysis can be computationally undertaken by the system 10 to determine the threshold voltage level corresponding to the change in amplitude of one or more of the fundamental or a harmonic waveform peak.

FIG. 9B illustrates that the amplitude of the fundamental (shown at 160 kHz) changes in response to radiation exposure and this information can be used to determine the shift in threshold voltage (similar to the discussion above). As shown, the delta (difference) between the threshold voltage levels associated with the amplitude increases with increasing radiation. Similarly, FIG. 9C is a graph of simulated response of a harmonic of the frequency spectrum of a parallel resonant tank voltage, again showing that the delta (difference) between the pre-radiation value and irradiation exposed values, increases with increasing radiation exposure, which can be used to determine the radiation dose.

Thus, the ratio or difference of the threshold voltage corresponding to the amplitude of fundamental peaks (pre and post radiation) or a ratio or difference between one or more harmonic peaks (pre and post radiation) can be used to determine the radiation dose. In the frequency domain, the system, is performing a distortion analysis of the waveform to determine the radiation dose associated with the altered waveform. Alternatively, the ratio between the fundamental and a selected harmonic can be used to provide a before and after radiation value. Using ratios can reduce the amount of processing distortion introduced into the measurement. The system 10 can be configured for signal processing within the range of about 100 kHz–100 MHz, and more preferably within about 100 kHz–15 MHz.

Figure 10:
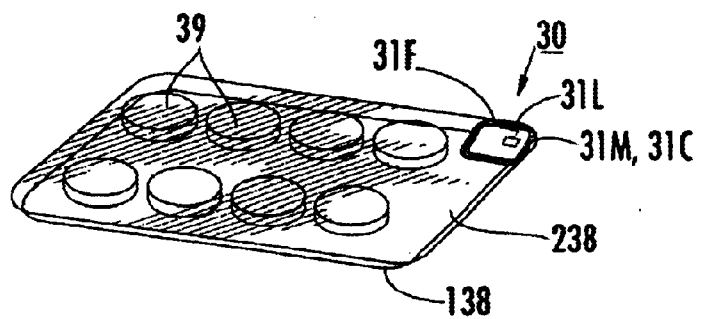
FIG. 10 is a perspective view of a sealed container with a radiation sensor positioned thereon according to the present invention.

As shown in FIG. 10, in certain embodiments, the sensor 30 presents a substantially planar flat profile when viewed from the side. As such, the sensor 30 and/or sensor circuit 31 preferably comprises a flat form conductive coil 31F, preferably formed of a metallic material such as copper, mylar, or the like defines or forms part of the tank circuit inductor 31L so as to provide the inductive component and to act as the antenna for the sensor 30. The conductive coil 31F can be etched or inked or magnet wire wound to provide a desired inductance, attached to onto an underlying thin substrate or flex circuit material. The MOS device 31M (such as the RADFET device) can be secured to and electrically engaged with the flat form coil 31F along with the tank capacitor 31C to provide a tank circuit 31. As described above, in operation, the circuit 31 can be passively activated/operated (without requiring a power source) and resonated by the reader 40 or primary circuit 40C through an inductive coupling 33.

FIG. 10 also illustrates that the sensor 30 can be applied to a packaged (which may be tamper resistant-sealed) product such that there is no need to disrupt the sealed package after irradiation to reduce the likelihood that pathogens may be introduced after irradiation is complete. The sealed package does not need to be airtight but is preferably configured to allow the product held therein to be isolated from undesirable exposures prior to purchase and/or the end use point. As shown in FIG. 10, the sealed or enclosed product includes a base container 138 (such as a foam, cardboard, basket, pallet, or other base which can hold the weight of the product(s) therein) with a sealant 238 overlay. The sensor 30 is shown on the outside of packaged product but can be placed on the backside or the inside of the package.

Figure 11A:
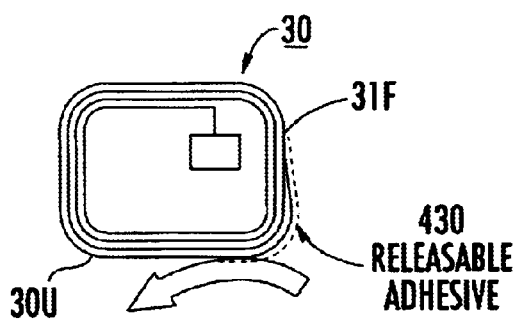
FIG. 11A is a top schematic view of a radiation sensor according to one embodiment of the present invention.
Figure 11B:
FIG. 11B is a side view of one embodiment of a multi-layer sensor according to the present invention.

In one embodiment, as illustrated by FIG. 11A, the underside of the sensor 30u can include a releasable adhesive to allow the sensor 30 (when attached to the outside of a product, food item, package, or sealant) to be secured to the desired object during processing and then easily removed without harming or tearing the underlying package, product, food item (skin or surface) or sealant material.

Figure 11C:
FIG. 11C is a top schematic view of a radiation label according to the present invention.

Further, as shown in FIG. 11C, the sensor 30' can be configured such that upon removal of the sensor circuit 31, any regulatory required marking, such as the approved visual indicia or logo 531 indicating the food has been electronically pasteurized can be displayed. Preferably, in this embodiment, the sensor 30' includes a first layer 330 which holds the sensor circuit 31, and an underlying second "label" layer 530. The sensor 30' also includes a releasable attachment (such as a double-sided tape or adhesive or other detachable bond) 430 therebetween. The bottom or underlying surface of the label layer 530 also preferably includes an attachment means 533 such as an adhesive or tape (single or double sided (preferably polymer tape)) applied thereto or formed thereon which has an increased bond strength so that, in operation, upon removal of the circuit layer 330, the label layer 530 remains in position on the object. Thus, the circuit layer 330 preferably has a peel strength which is less than the bond strength of the attachment means 533 of label layer 530 to the underlying object.

In operation, the sensor 30' is positioned on and attached to a desired object such that the circuit 31 is facing away from the object. After irradiation, the sensor layer 330 is detached from the sensor 30' exposing the label layer 530 which then presents the radiation identifier or logo 531 such that is viewable by consumers or potential or actual purchasers.

FIG. 28 illustrates another embodiment of sensor 30 or dosimetry tag 30t. As shown, the sensor circuit 31 is held on a thin substrate 28C and is associated with a bar code label 30BC with parametric data encoded thereon. The sensor 30 can include a printed circuit board 30PCB, a winding of magnet or conductive wire 31F', and leads 30W which connect the two.

Other tank circuit configurations can also be employed as noted above. The tank circuit is configured such that, in operation, the resonant frequency of the electronic (tank) circuit can change in a detectable manner and/or the sharpness (i.e., represented by the "Q" factor which corresponds to the resonant frequency, the inductance, and the resistance of the circuit) of the tank circuit can change in a detectable manner responsive to the level of radiation. Alternatively, the radiation dose can be calculated based on a detected change in the value of the capacitance of the capacitive element 31C of the circuit (pre and post radiation). That is, recognizing that the resonant frequency ($\omega$) of the tank circuit can be mathematically expressed as $\omega = 1/(LC)^{1/2}$ and the capacitance can be expressed as $C = (A\in)/d$, where "$\in$" is the dielectric constant of the insulator material, "A" is the area of the capacitor, and "d" is the thickness of the dielectric' (the capacitance is a function of dielectric permittivity, the plate area, and distance between the plates). Similarly, the Q factor can be expressed as $Q = \omega L/R$, where "R" is the resistance in the tank circuit, and "L" is the inductance value of the inductive element 31L, one or more of these parameters can be used as a basis for determining radiation dose.

Figure 12A:
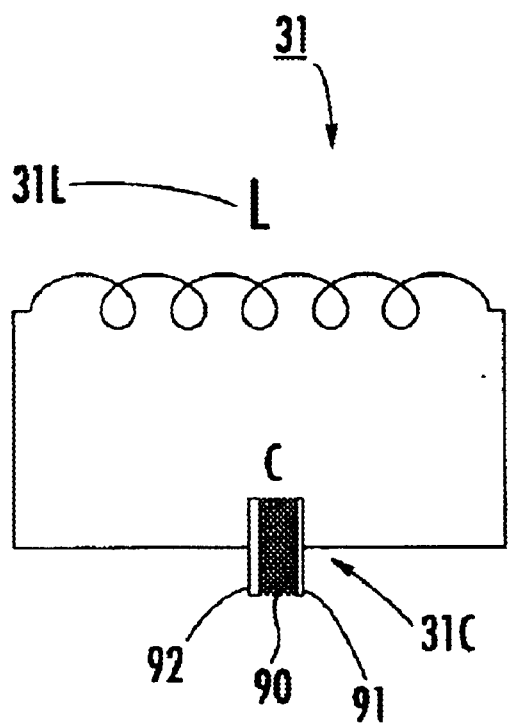
FIGS. 12A and 12B are circuit diagrams of alternate embodiments of tank circuits suitable for use as a sensing element in one embodiment of the present invention.
Figure 12B:
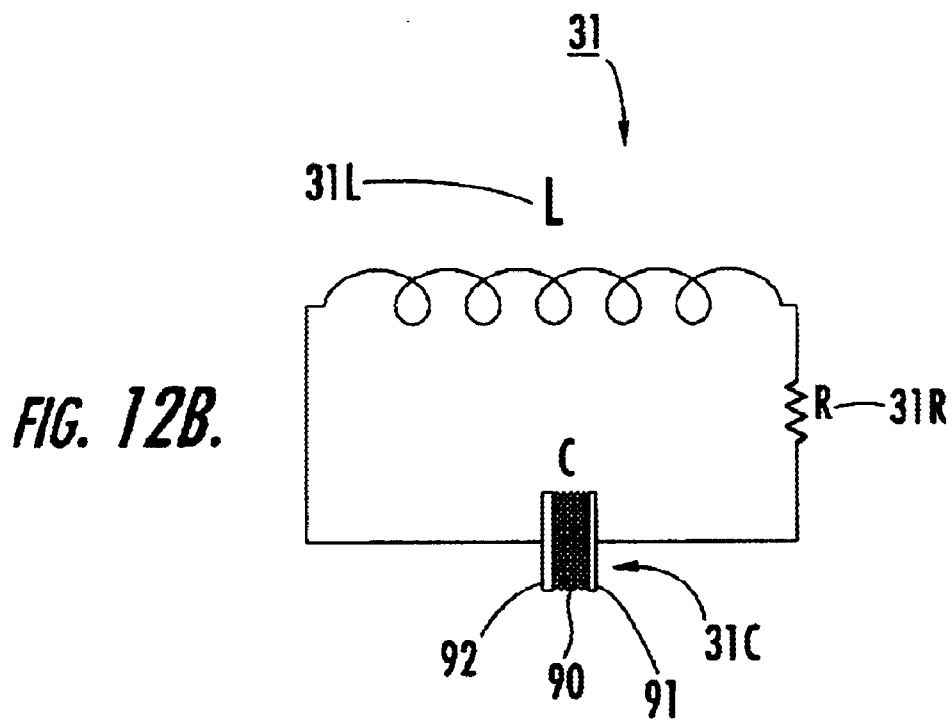

For example, as shown in FIGS. 12A and 12B, the electronic circuit 31 can be configured with the capacitor 31L formed from a center dielectric insulator material 90, selected based on its ability to predictably alter the capacitance value in response to radiation. The capacitor 31L includes two opposing outer layers 91, 92 formed from thin flat metallized layers or metal or foil plates positioned to sandwich the center dielectric material 90. FIG. 12B illustrates the use of a resistor 31R which may be provided in a number of ways as is well known to those of skill in the art, such as by the substrate material holding the elements 31L, 31C, or as a separate discrete component. As described above, the inductive element 31L can be formed as a flat conductive coil shaped to form the inductive element as is well known to those of skill in the art. In this embodiment, the center dielectric material 90 is selected based on its ability to alter its behavior in a predictable manner when exposed to radiation at sterilization exposure levels in the desired range(s). The inductive element 31L is preferably configured such that it is left substantially unchanged from its non-irradiated state even after radiation exposure.

The insulator 90 may be chosen from a plastic or polymer based material, recognizing that certain plastics become cross-lined during irradiation, due, at least partly, to the formation of free radicals as a byproduct of ionizing radiation. This, in turn, can cause a change in the elastic property of the material. Taking a reading of the capacitance before and after radiation may provide a dose-correlatable value. Conductive polymers may also be employed because the source of conductivity is typically in a long-chain molecule and ionizing radiation is likely to cause cross linking that may interfere with the conduction process. Alternatively, the insulator material can be configured to comprise dielectric crystals or ferroelectric materials (such as LiNbO$_3$) which have a net polarization at room temperature. Radiation may induce detectable point defects in the material. Indeed, the dielectric constant of some crystals (perhaps even LiF, a common TLD material) may change the dielectric capacitance in a detectable manner. The change could then be assessed to determine radiation dose.

In one embodiment, using a pre-selected insulator material to form the insulator or dielectric material of the capacitive element 31C such that it can change the capacitance of the circuit (based on exposure to radiation), and, thus, result in an altered resonant frequency of the circuit 31. The altered resonant frequency can be correlated to the amount of radiation received, thus providing an inexpensive way to quantify the radiation dose.

Alternatively, or additionally, the material of the insulator or dielectric 90 can be selected such that there is a change in conductivity of the material based on exposure to radiation. The resultant change in leakage current through the material may then alter the Q factor of the electronic (tank) circuit 31. In another embodiment, the dielectric material 90 can be selected such that it comprises a conductive or weakly conductive polymer. Changes in the conductivity resulting from irradiation can also alter (typically decrease the conductivity) which could be measured as a change in the Q factor. The altered Q factor can then be correlated to radiation level to calculate the radiation exposure dose.

Other ways to induce detectable operative changes in the sensor circuit 31, include the use of PN junction devices. The creation of radiation-based defects within the bulk of the silicon can alter recombination lifetimes in the depletion region of a diode. This change can be assessed, for example, by measuring the increase in reverse-bias leakage current of the diode. Still another way to induce detectable operative changes includes the use of radiographic or colormetric sensors. For example, the system can include an LED of a particular wavelength and a photodiode detector configured to operably engage therewith. The LED can be used to "look" at the color of a radiochromatic tag, similar to the tags conventionally used (as discussed in the background above). A photodiode detector can then produce a current proportional to the light from the LED directed into or passing through the radiochromatic material of the tag (not shown).

Figure 13:
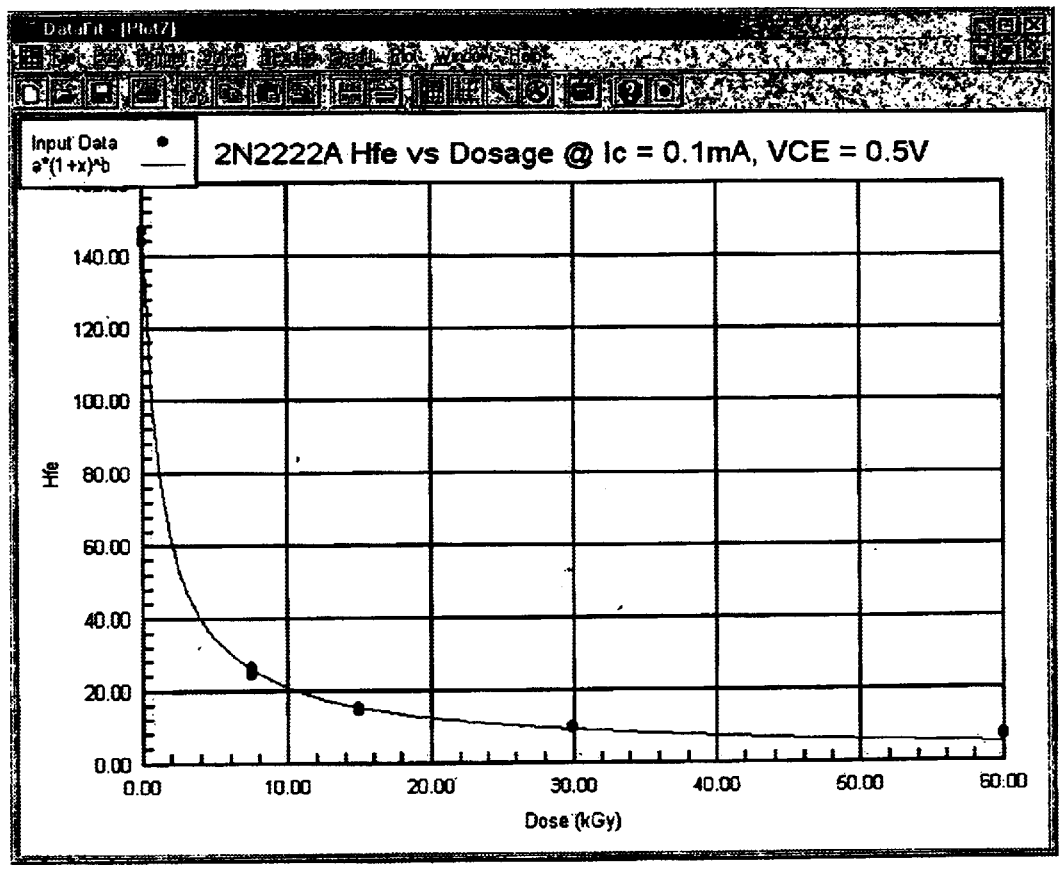
FIG. 13 is a graph of Hfe vs. total applied dose for a 2N2222A NPN transistor.

In other embodiments, another way to induce detectable operative changes in the sensor circuit 31 is to use a bipolar transistor. FIG. 13 illustrates a plot of Hfe versus total applied (radiation) dose for a bipolar transistor; namely, a 2N2222A NPN transistor. As shown, the Hfe versus dosage of an exemplary NPN transistor is illustrated. This data can be obtained from a NASA radnet site (www.radnet.jpl.nasa.gov/TID). The data was fitted to Equation (1).

$$Hfe = 145.15 * (1 + kGrey)^{-0.8057} \quad \text{Equation (1)}$$

As shown, the Hfe of the transistor varies relatively substantially over the range of 0.01 kGy to 50 kGy. This variation can be detected using either direct contact or telemetric methods to establish total dose. As for other embodiments, in this dosimeter embodiment, the transistor can be characterized prior to irradiation and the characterization data can be stored in a computer database and/or printed on a bar-code label associated with the sensor 30. In certain embodiments, which may be particularly suitable for direct contact detection or measurement methods (as opposed to wireless detection), the value of the pre-irradiation signal parameter (Hfe) can be used to normalize a desired curvefit equation. For example, if the transistor has an initial Hfe of 145 at a given Ic of 0.1 mA and the Hfe of the post-irradiated transistor is measured at 20, then the dosage can be calculated using Equation (2).

$$\left(\frac{Hfe \text{ measured}}{Hfe \text{ initial}}\right)^{-\left(\frac{1}{0.8057}\right)} - 1 = dose \quad \text{Equation (2)}$$

For an Hfe measured (post irradiation) of 20 and a pre-irradiation or initial Hfe of 145, this results in a computed radiation dose of 10.69 kGy. This value is consistent with the curvefit and tabular data. As is well known to those of skill in the art, mathematical corrections may be made to the calculated result to adjust for gains at various temperatures and other desired variables.

Other transistors with Hfe degradation characteristics may be evaluated and a curvefit equation defined for that component. For example, a PNP transistor, such as a 2N2907A, has a similar Hfe degradation with exposure to radiation from sources such as Cobalt-60. The mechanisms for the Hfe degradation are known. See e.g., Messenger et al., *The Effects of Radiation on Electronic Systems*, (Van Nostrand Reinhold, 1992) and Ma et al., in *Ionizing Radiation Effects in MOS Devices and Circuits*, (Wiley, 1989).

In any event, the post-irradiation gain for the transistors may be detected or evaluated in a number of wireless or telemetric (non-contact) methods as well as via direct electrical contact according to embodiments of the present invention. In certain embodiments, the Hfe of the transistor can be inferred from a time, voltage, spectral content, or "Q" measurement and a radiation dose calculated (either directly or indirectly) from a mathematical model or predetermined relationship of Hfe to dose.

Figure 17:
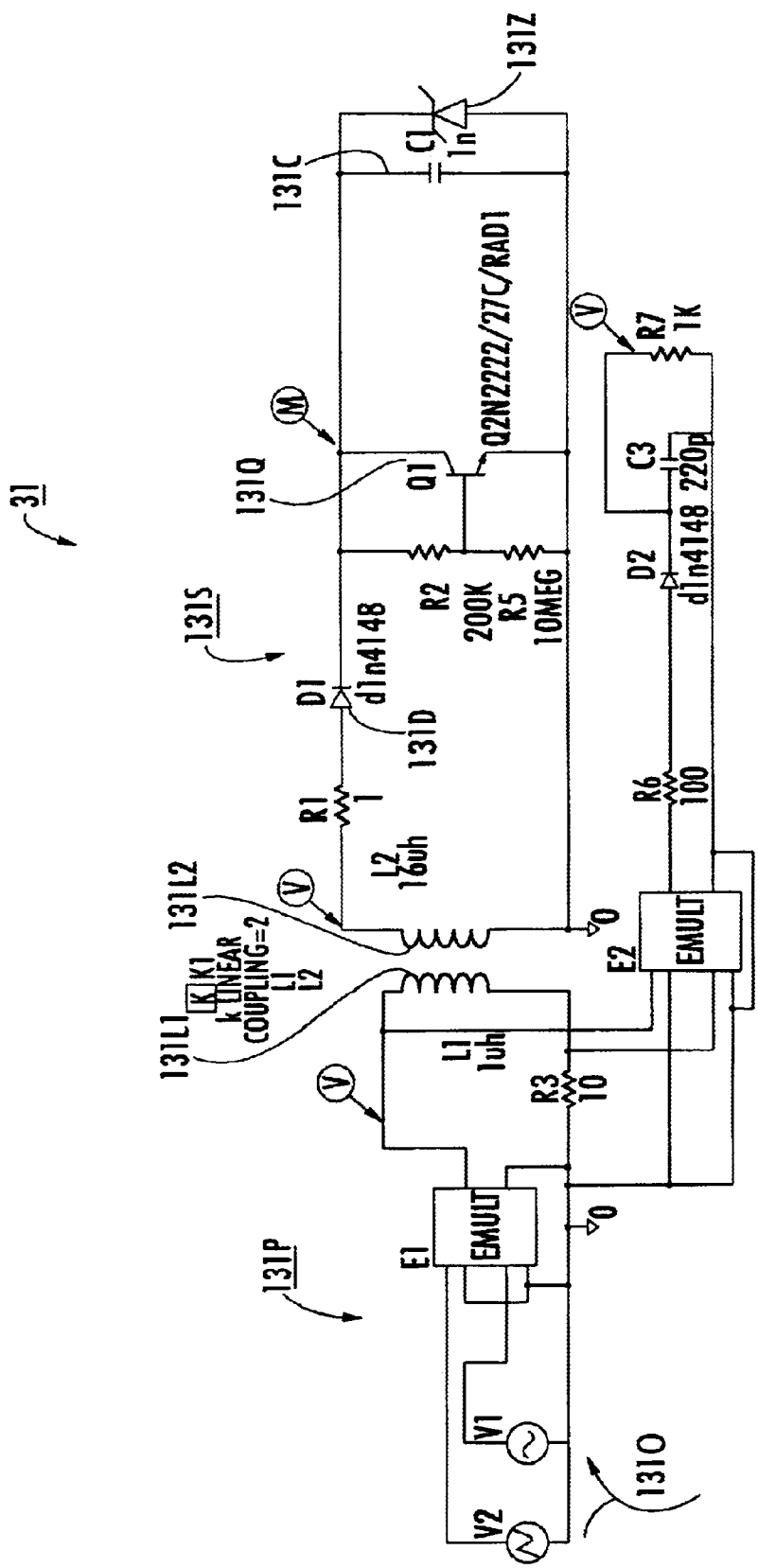
FIG. 17 is a schematic illustration of a radiation sensor according to embodiments of the present invention.

FIG. 17 illustrates a sensor circuit 31 with a BJT (Bipolar Junction Transistor), which may be an NPN transistor, configured to act as the dosimeter. In other embodiments, as will be discussed below, a sensor circuit 31 similar to that shown in FIG. 17 scan be configured so that a diode can be used to allow the dose to be determined. In operation, an RF means of determining a parameter shift in the transistor may be used to determined dose.

As shown in FIG. 17, the sensor circuit 31 can include an inductor 131L2 (L2), a rectifying diode 131D (D1), a capacitor 131C (C1), a zener diode 131Z, and a transistor 131Q (Q1) shown with biasing resistors (R2 and R5). As noted above, the calibration (pre-irradiation or characterization) data can be used to correlate the post-radiation Hfe of the test transistor 131Q. From the Hfe data, a statistical correlation and/or curve-fitting program can be used to determine the radiation dose delivered to the sensor 30 (and the object undergoing treatment). In certain embodiments, as shown in FIG. 17, the primary side of the circuit 131P (which may also form a portion of a wireless reader 40) includes a controlled oscillator 131O which, as also shown in FIG. 17, includes components V1, V2, and E1. The primary circuit 131P can also include current monitoring and conditioning circuitry (shown as components R3, E2, R6, D2, C3, and R7) as well as a coupling inductor 131L1. The inductors (L1 and 12) may be either printed "wiring" or wire coiled or wound to a desired form. In operation, the capacitor 131C on the secondary side of the circuit 131S can be charged until the zener diode 131Z voltage is reached. The power of the primary side 131P can be monitored to determine when the capacitor is charged to the zener voltage. The oscillator 131O can be turned off, and the secondary-side capacitor 131C discharged through 131Q (Q1). The rate at which 131C (C1) is discharged is a function of Hfe of 131Q (Q1). At a time, t1, later, the oscillator 131O can be re-powered, reactivated, or reapplied and the primary-side power 131P can be monitored to determine when the secondary-side 131S capacitor 131C begins to recharge. From this information/data, the change in voltage on the capacitor can be determined and related to establish the Hfe of the transistor 131Q. The Hfe values (before and after radiation) can be compared to determine the radiation dose. This dose can be recorded along with the serial number of the radiation sensor 30 as well as the food container as noted above.

Figures 18A, 18B, 18C:
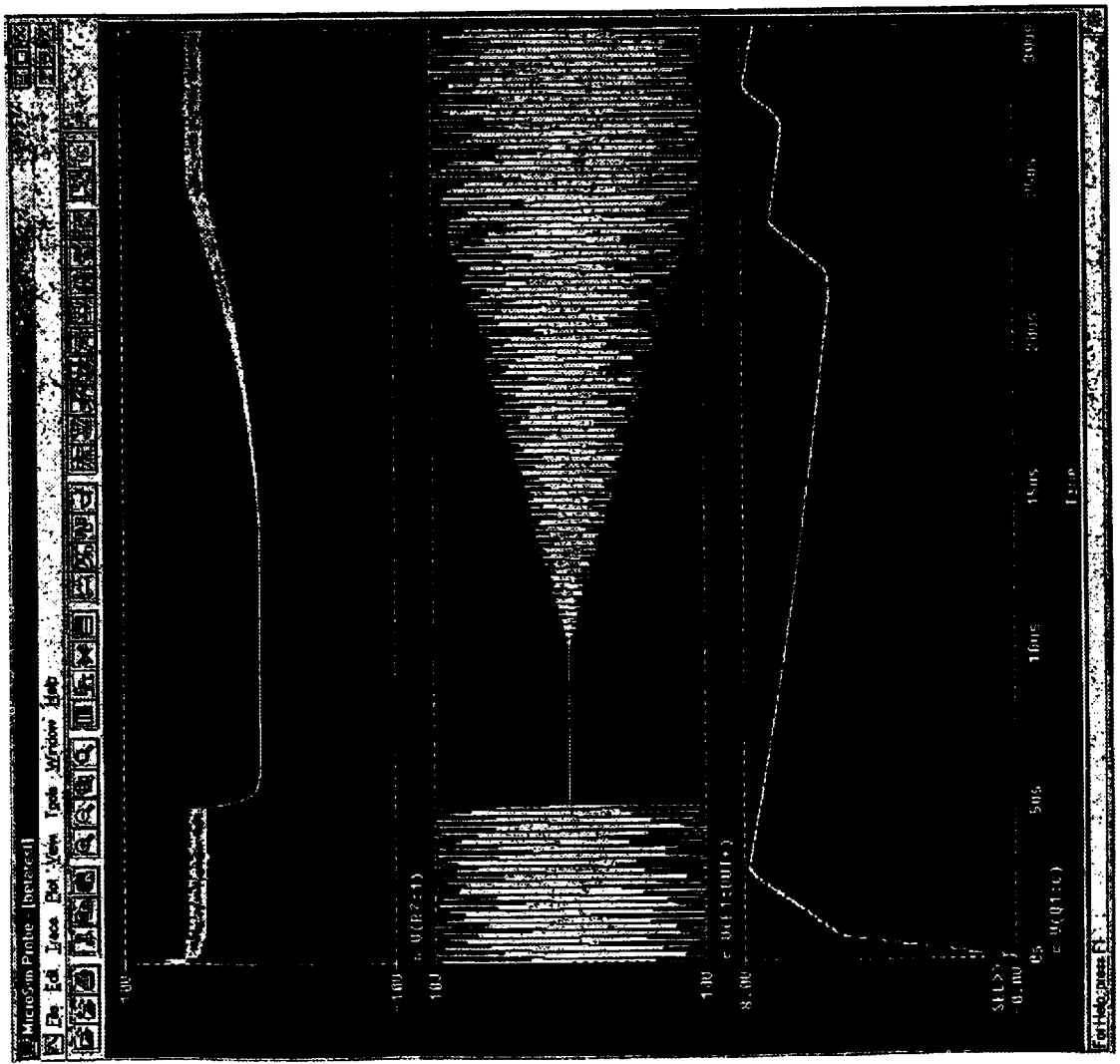
FIGS. 18A–18C are graphs of operational waveforms of simulation results which may be used in assessing radiation based on a circuit such as that shown in FIG. 17 according to certain embodiments of the present invention.

FIGS. 18A–18C illustrate operational waveform graphs of simulation results for the circuit shown in FIG. 17. The waveform shown in FIG. 18A illustrates the power delivered by the primary circuit 131P to the secondary circuit 131S. This data may be obtained by integrating the voltage and current delivered to the primary side inductor and subtracting the primary-side idle power loss. The waveform shown in FIG. 18B illustrates the power oscillator 131O voltage signal. The waveform shown in FIG. 18C is the voltage across 131C (FIG. 17, C1). In the example shown, the power oscillator 131O (FIG. 17) turns "on" at time t=0 to initially charge capacitor 131C (FIG. 17, C1) until time=5 μs. The primary side can then detect when the capacitor 131C (FIG. 17, C1) is fully charged to the zener voltage 131Z by evaluating the rate at which power is being delivered to the circuit. As shown, from time t=5 μs to t=10 μs, the power oscillator 131O is "off" and the capacitor 131C (FIG. 17), discharges. As is also shown, at time t=10 μs, the power oscillator 131O (FIG. 17) is ramped back up and the voltage power is monitored. When the power oscillator 131O (FIG. 17) reaches the voltage where power is being drawn again to charge the capacitor C1 (which can be determined from the primary detection circuitry in the primary circuit), the time from the beginning the of the power ramp voltage can be recorded/determined (t=10 μs). Thus, the rate of power draw from the primary circuit 131P to the secondary circuit 131S can be monitored.

In certain embodiment, in operation when the primary circuit 131P operates without a sensor 30 or tag with the secondary circuit 131S within range, the energy drawn from the primary circuit 131P is associated with the losses to oscillate the tank. This energy loss can be measured and stored (such as in a controller or signal processor). When a sensor 30 with the secondary circuit 131S is in the range of the detector, and hence the primary circuit 131P (which may be identified by the barcode scanner), the energy drawn from the primary circuit 131P can be represented as equal to the sum of the energy in: (a) the primary tank, (b) the secondary tank, (c) the energy to charge 131C (C1) and (d) some "constant" losses associated with the zener and/or transistor circuits. The energy to charge 131C (C1) may be determined by monitoring the energy delivered from the primary circuit 131P. Because the value of 131C (C1) and the zener 131Z voltage are known (such as from the parametric characterization), the voltage discharge across 131C (C1) can be calculated based on when the primary circuit 131P begins to recharge the capacitor 131C. The amount of voltage that the capacitor has discharged and the time can be used to correlate the Hfe of the transistor 131Q.

The time where the capacitor 131C (C1) has again reached the zener voltage 131Z can also be determined. These two measurements can be used to determine the voltage discharge on the capacitor 131C (C1) and this data related to the Hfe of the transistor 131Q. The primary circuit 131P can include primary detection circuitry (not shown) such as amplifiers, integrators, multipliers, and the like which can be used to monitor the energy transfer as is known to those of skill in the art. It is also noted that in certain embodiments, the E1 (FIG. 17) voltage in the primary side of the circuit 131P (FIG. 17) may be adjusted to linearize the relationship between time/voltage measurements and the dosage relationship. The adjustments may be in time, amplitude, and/or frequency.

In certain embodiments, the following mathematical relationships and equations can be used to determine dose.

$$Vc_1(t_1) = \int_{t_o}^{t_1} -(i(t)dt)/C + V_{co} \qquad \text{Equation (3)}$$

Stated differently, $$\Delta V_c = \int_{t_o}^{t_1} -(i(t)dt)/C \qquad \text{Equation (4)}$$

where ΔVc is known (it is measured at the time when power is drawn from the primary circuit 131P until the capacitor reaches the zener voltage), in the example shown in FIG. 18, the initial time is at about (t=15 μs). The second time measurement is when the zener voltage is reached on the secondary side, at this time, the slope will change (such as at t=23–25 seconds). "C" is the capacitance of C1 and is a scaling constant and (i) is the current associated with the transistor. In addition, $Vc_0$ is known, it is the zener diode voltage. By measuring the voltage change over time indirectly, it is possible to determine i(t) and, thus, radiation dose due to Hfe degradation.

$$i(t)=i_c+i_b=hfe(\text{dose})*ib+ib=ib(1+hfe(\text{dose})) \qquad \text{Equation (5)}$$

where ic, ib are a function of dose.

In other embodiments, the Hfe value can be determined in other ways. For example, the "extra" energy delivered from the primary side 131P to the secondary side 131S during the recharge cycle can be measured to deduce the voltage change on the capacitor using the relationship represented as (E=½CV²). That is, "E" attributed to the extra energy from the primary circuit 131P is known (identify this value as E delivered), C1 is known and the Efinal is known because it is based on a known zener final voltage, and Eintial can be calculated. Thus Eintial can be calculated from Equation (6). V initial can them be calculated based on (E=½CV²). Vinitial can be used to calculate the Hfe of the transistor.

$$E\text{ initial}=E\text{ final}-E\text{ delivered} \qquad \text{Equation (6)}$$

Figure 19:
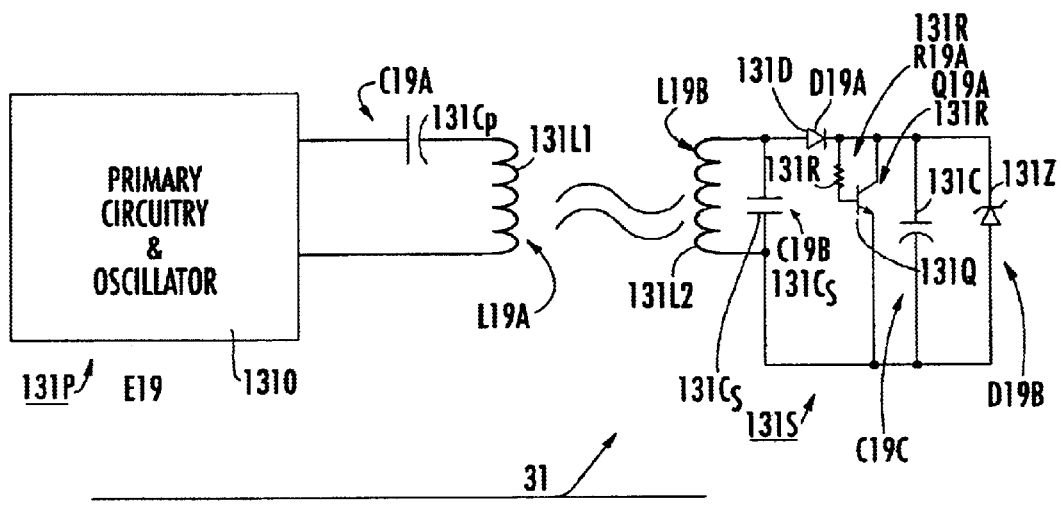
FIG. 19 is a diagram of a circuit having extended sensor range according to embodiments of the present invention.

Turning now to FIG. 19, another embodiment of a sensor circuit 31 (similar to that shown in FIG. 17) is shown. In this embodiment, the primary circuit 131P includes the oscillator 131O, a primary capacitor 131Cp and an inductor 131L1. The primary circuit 131P can also include sensing circuitry to detect when the capacitor 131C (C19C) has been charged to the zener voltage corresponding to the zener diode 131Z (D19B). The secondary circuit 131S includes a capacitor 131Cs and the inductor 131L2 and may also include a diode 131D which can rectify the signal from 131L2 (L19B) and charge capacitor 131C (C19C). The secondary circuit can also include a biasing resistor 131R which can adjust the bias on the dose sensitive transistor 131Q (Q19A). The primary capacitor and inductor 131Cp, 131L1, respectively, can be tuned to a resonant frequency similar to that of the secondary circuit capacitor and inductor, 131L2, 131Cs to extend the range when the primary and secondary circuits may be coupled/operated but otherwise operates similar to the operation of FIG. 17 described above.

Figure 20:
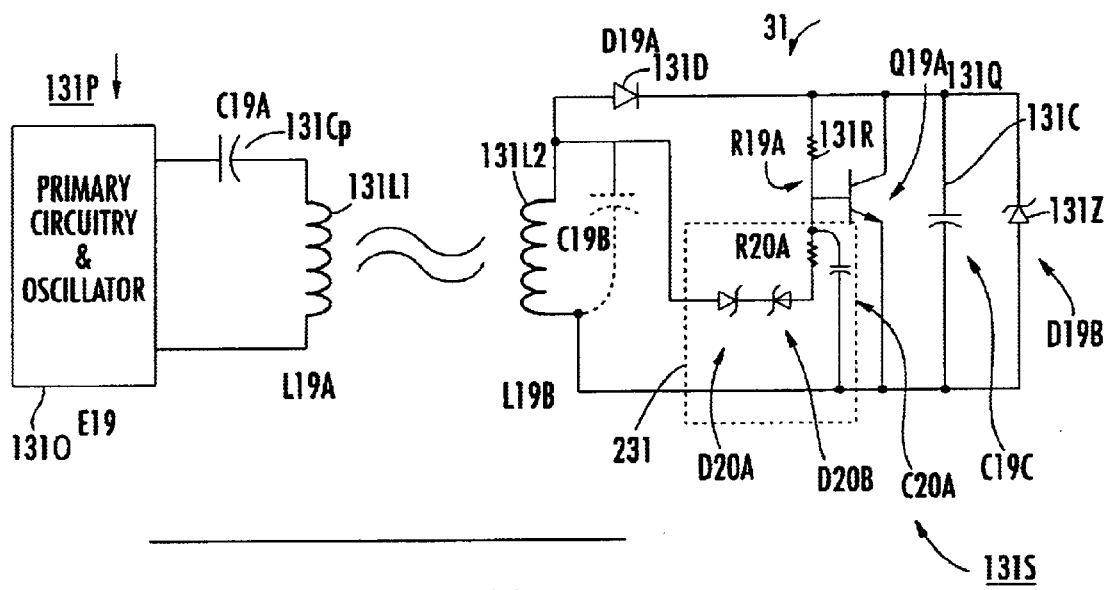
FIG. 20 is a diagram of alternate embodiments of circuitry according to embodiments of the present invention.

FIG. 20 illustrates another embodiment along the lines of the circuit shown in FIG. 17. In this embodiment, the circuit 31 includes circuitry means 231 to disable the flow of current in the transistor 131Q (Q19A) while the signal is present across 131L2 (L19B). That is, the circuitry means 231 can disable the operation of the NPN transistor while the power oscillator is operating. As shown the circuitry means 231 includes components D20A, D20B, C20A, and R20A. This configuration may improve the measurement of the charging characteristics of the circuit because 131C is charged by removing or inhibiting the influence of the transistor 131Q circuitry.

Figures 21A, 21B, 21C:
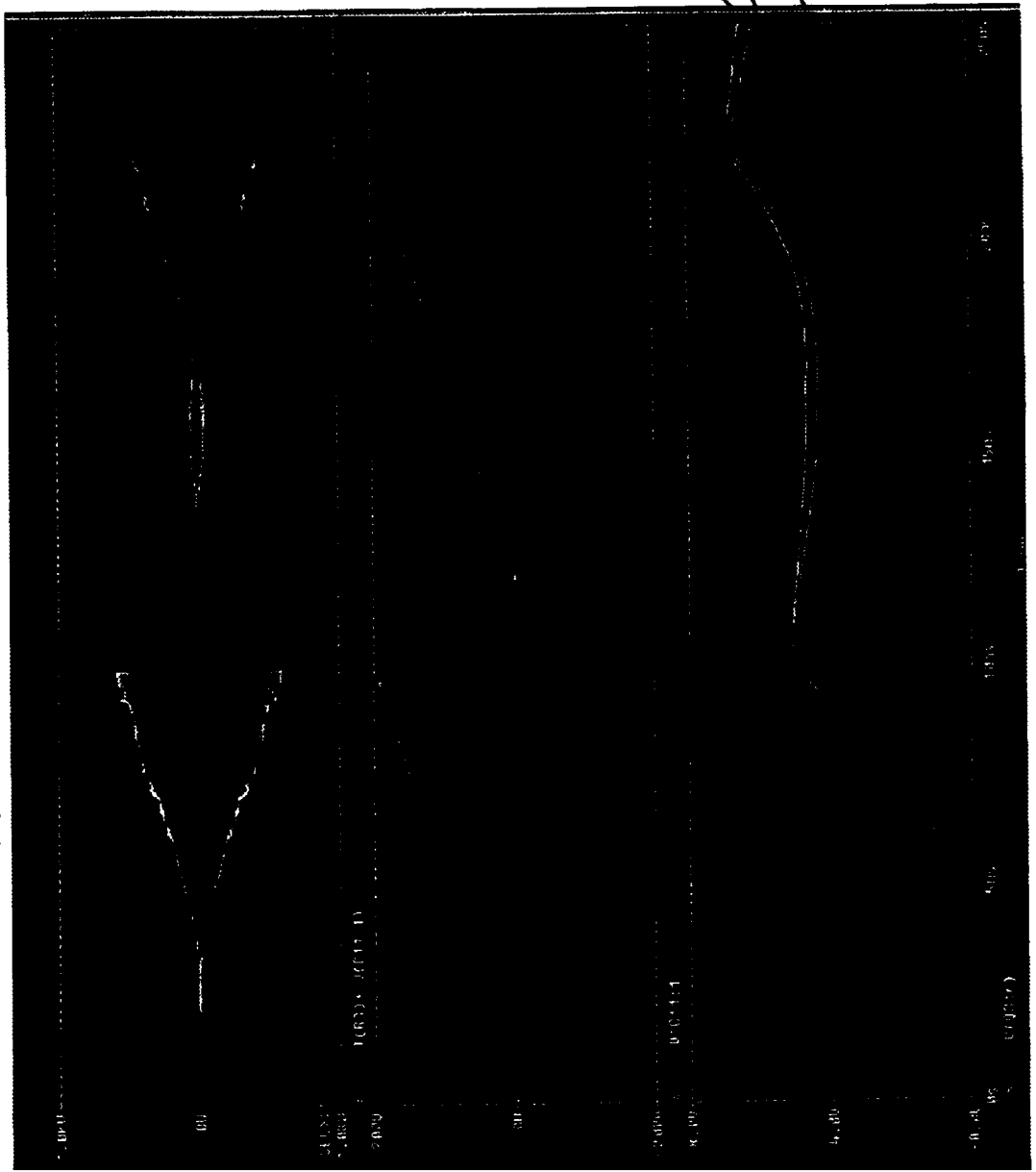

FIGS. 21A–C illustrate simulated operational waveforms for the circuit shown in FIG. 20. FIG. 21A illustrates the primary power (sensed or detected) signal over time. FIG. 21B illustrates the primary voltage from the controlled oscillator 131O (E19). FIG. 21C illustrates the 131C (C19C) voltage. Note that the charging ramp is not influenced by Hfe. FIG. 21C also illustrates three lines, one for each of three different Hfe values (the three lines appear in the graph after about 10 ms).

Figure 22:
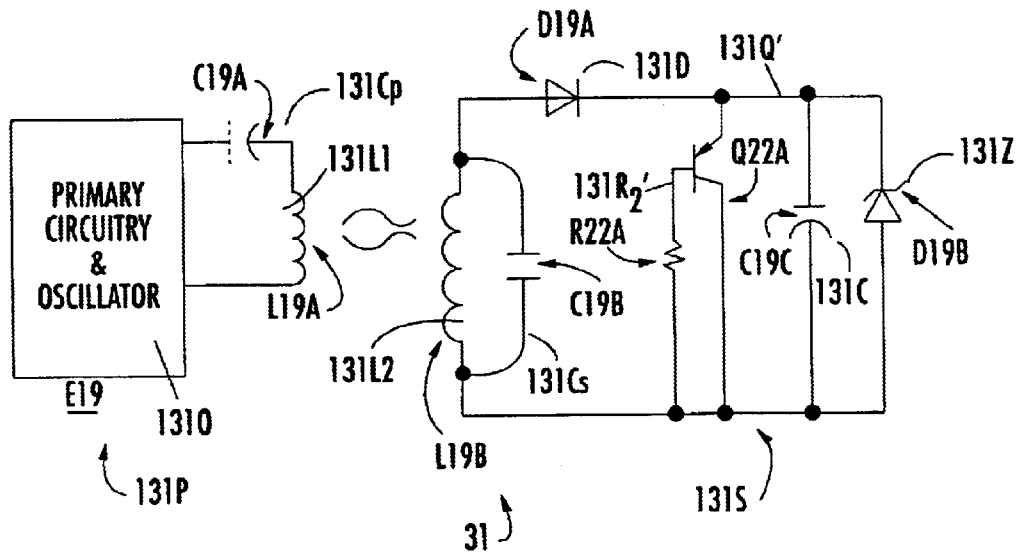
FIG. 22 is a circuit diagram of a sensor circuit employing a PNP transistor according to other embodiment of the present invention.

FIG. 22 is an illustration of yet another embodiment of a circuit 31. As shown, the circuit 31 is similar to that of FIG. 17 but, rather than a NPN transistor, it includes a PNP transistor 131Q' (Q22) and an associated bias resistor 131R' (R22A).

Figure 23:
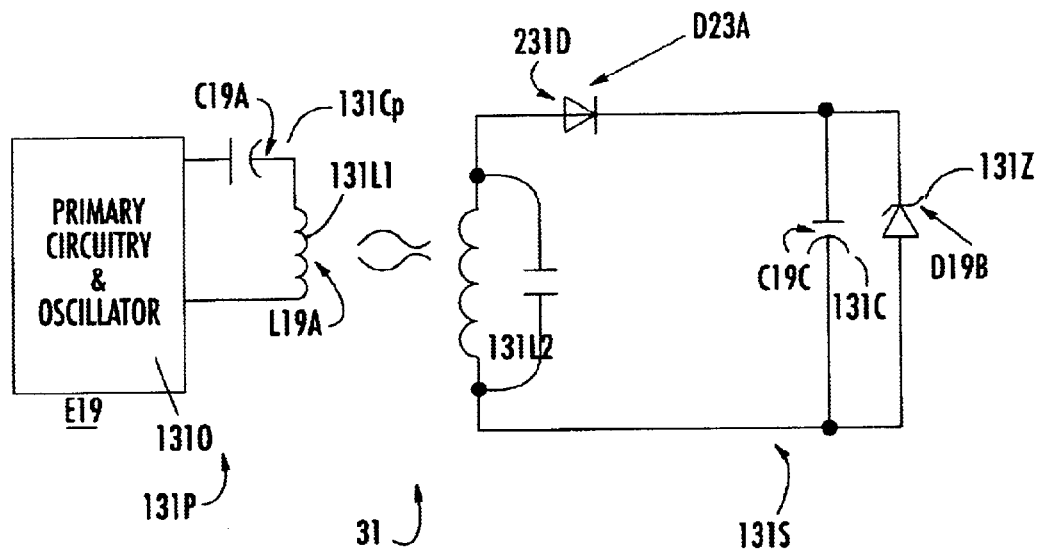
FIG. 23 is a circuit diagram illustrating a sensor circuit comprising a diode according to embodiments of the present invention.
Figures 24A, 24B, 24C:
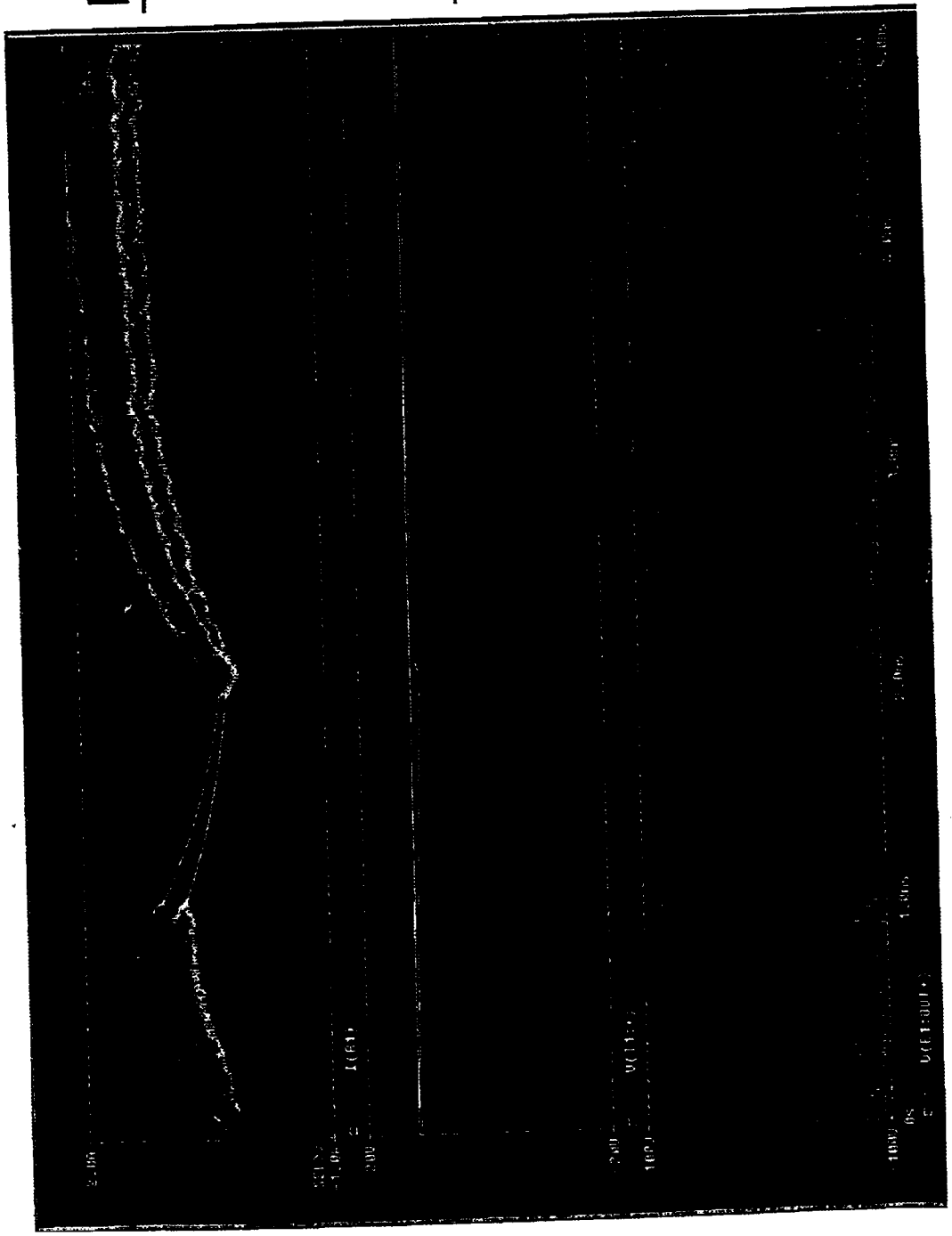
FIGS. 24A–24C are graphs of waveforms of a simulation using the circuit of FIG. 23.

FIG. 23 illustrates yet another embodiment of the sensor circuit 31. As shown, instead of a transistor, the circuit uses a diode 231D. In this embodiment, the discharge of the capacitor 131C is generated via the leakage current of 231D (D23A). The leakage current can be a function of dosage that can be estimated by determining the change in voltage of 131C, over time, as shown in FIGS. 24A–C. FIG. 24A illustrates the simulated rectified average primary current in the primary side of the circuit 131P about the inductor/capacitor 131L1, 131Cp, respectively (the L19A/C19A circuit), over time. FIG. 24B illustrates the voltage at the capacitor 131C (C19C), and FIG. 24C illustrates the voltage at the oscillator 131O (E19).

Figure 25:
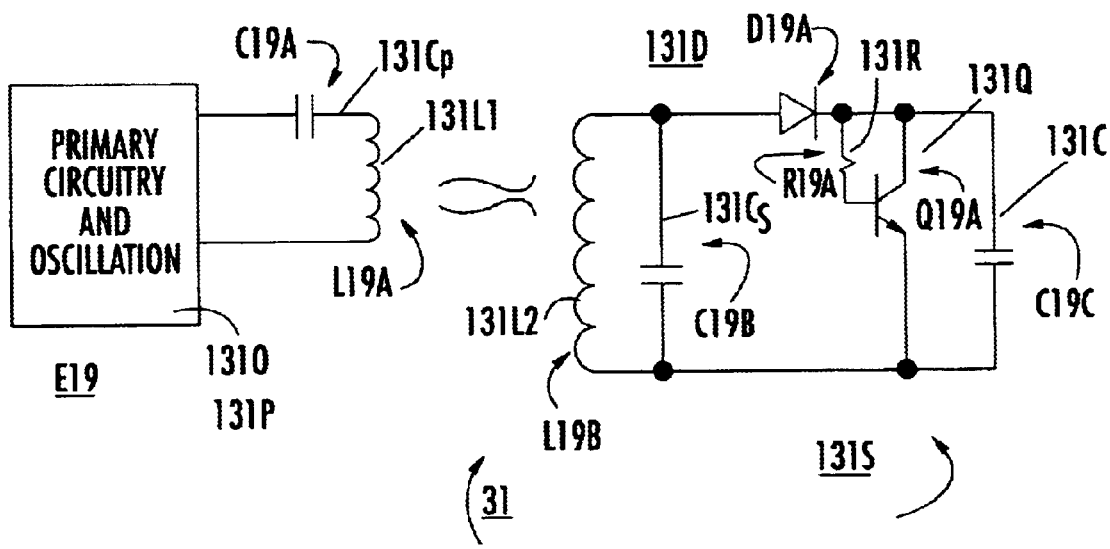
FIG. 25 is a circuit diagram for measuring radiation according to still other embodiments of the present invention where the Q of the circuit corresponds to total dose.
Figure 26:
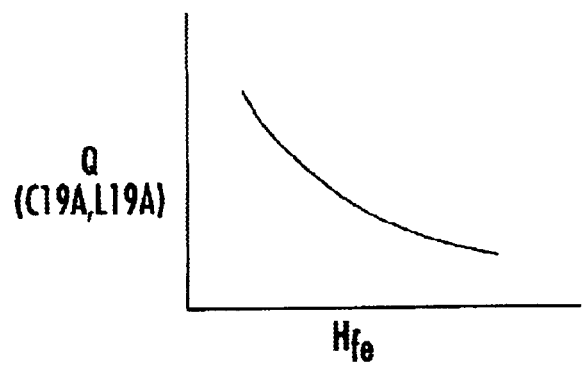
FIG. 26 is a graph illustrating the relationship between Q and Hfe based on the circuit shown in FIG. 25.

FIG. 25 illustrates an additional embodiment of the sensor circuit 31. In this embodiment, the Q of the primary tank circuit 131Cp (C19A), 131L1 (L19A) is measured and varies with the Hfe (and thus, total dose) applied to 131Q (Q19A). This circuit can be reconfigured to operate with a PNP transistor similar to that shown in FIG. 22. FIG. 26 is a graph showing the relationship between Q and Hfe in the circuit of FIG. 25. The Hfe may be determined and correlated to dose as described above (such as for the embodiment shown in FIGS. 13–18).

FIG. 27 shows yet another embodiment of a circuit 31 according to the present invention. As shown, a full-bridge 231Br can be used to form the dosimeter 30. That is, 131D (D19A) is replaced with a full bridge comprising D27A, D27B, D27C, and D27D. The full bridge configuration may increase signal strength. The full bridge configuration may be added to other circuit embodiments described herein.

The present invention provides a cost effective way to monitor radiation doses in irradiated foods by configuring the sensor circuit to change in response to exposure to radiation. The dosimeters may be suitable for mass-production environments and can include means to wirelessly or telemetrically relay detected parameter values associated with changes due to radiation exposure to a computer program adapted to calculate and provide the associated radiation dose without requiring labor intensive efforts on the part of an inspector or operator. The radiation dose can also be read during exposure to provide an input into a feedback control used in a radiation control system to facilitate proper radiation exposure.

Irradiation may be carried out by suitable modalities as is known to those of skill in the art. For example, by directing radiation to the object undergoing the procedure in an amount sufficient to achieve sterilization using a radioactive source or element such as, but not limited to, Cobalt-60, Cesium-137, electron beams produced by a linear accelerator, and the like. The irradiation process can be carried out by a stationary system or by a portable system where appropriate. The present invention provides an economic, single use disposable sensor that can monitor the radiation dose to help indicate that pathogens are destroyed effectively.

As will be appreciated by one of skill in the art, the present invention may be embodied as an apparatus or system, a method, a data or signal processing system, or a computer program product. Accordingly, embodiments of the present invention may take the form of an entirely hardware embodiment, an entirely software embodiment, or an embodiment combining software and hardware aspects. Furthermore, certain embodiments of the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or even assembly language. The program code may execute entirely on the user's (monitoring site) computer, partly on the user's computer as a stand-alone software package, partly on the user's computer and partly on a remote computer or entirely on the remote computer. In the latter scenario, the remote computer may be connected to the user's computer through wireless means and/or via a local area network (LAN) or a wide area network (WAN), or the connection may be made to an external computer (for example, through the Internet using an Internet Service Provider).

The flowcharts and block diagrams of certain of the figures herein illustrate the architecture, functionality, and operation of possible implementations of radiation dosimeters and associated systems according to the present invention. In this regard, each block in the flow charts or block diagrams represents a module, segment, operation, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for determining an irradiation dose delivered in situ to an object, comprising the steps of:
   irradiating at least one object with a radiation dose which is sufficient to sterilize the object;
   positioning a passively powered sensor proximate to the object such that it is held proximate thereto during said irradiating step, wherein said sensor has associated operational parameters, and wherein one or more of the operational parameters is configured to change responsive to said irradiating step, wherein the sensor is configured as a single-use sensor;
   wirelessly transmitting data associated with the change in the operational parameter in the sensor; and
   determining the radiation dose received by the object during said irradiating step based on the change in the operational parameter.

2. A method according to claim 1, wherein the object is an edible item.

3. A method according to claim 1, wherein the object is a medical object.

4. A method according to claim 1, wherein the sensor comprises a MOSFET device with an associated threshold voltage which changes when exposed to radiation, and wherein said determining step further includes the step of analyzing the change in the threshold voltage.

5. A method according to claim 4, wherein said method further comprises the step of determining a pre-radiation threshold voltage value prior to said irradiating step.

6. A method according to claim 5, wherein said determining step comprises comparing the value of the pre-radiation threshold voltage to the value obtained in said transmitting step.

7. A method according to claim 1, wherein the sensor has an associated resonance frequency which changes when exposed to radiation, and wherein said determining step comprises analyzing the change in the resonance frequency.

8. A method according to claim 1, wherein the sensor includes an electronic circuit having a Q factor, a resonance frequency, an inductance, and a resistance associated therewith, the Q factor corresponding to the resonance frequency, the inductance, and the resistance, and wherein the Q factor changes when exposed to radiation, and wherein said determining step includes the step of analyzing the change in the Q factor.

9. A method according to claim 1, wherein said sensor includes a tank circuit with a capacitor element, wherein the capacitor element comprises opposing conductive plates and a dielectric material therebetween, and wherein the dielectric material of the capacitor element is selected such that one or more of a physical or electrical characteristic of the dielectric material is altered when irradiated.

10. A method according to claim 1, said method further comprising the step of packaging the object in a container prior to said irradiating step.

11. A method according to claim 1, wherein said transmitting and determining steps are carried out at least once during said irradiating step.

12. A method according to claim 1, wherein said transmitting and determining steps are repeated during said irradiating step.

13. A method according to claim 1, wherein said transmitting and determining steps are carried out at least once after the completion of said irradiating step, and wherein said irradiating step is carried out such that it introduces radiation which is in the range of from about 0.01–10 kGy to the object.

14. A method according to claim 13, wherein said transmitting and determining steps are also carried out at least once during said irradiating step.

15. A method according to claim 13, further comprising the step of monitoring the determined radiation dose during said irradiating step to determine when to terminate said irradiating step.

16. A method according to claim 1, wherein the determined radiation dose provided by said determining step is calculated by a computer program based on input of data provided by said transmitting step.

17. A method according to claim 16, wherein the determined radiation dose provided by said determining step is input into a computer readable database as an electronic process history data record.

18. A method according to claim 1, wherein said irradiating step is carried out such that a plurality of objects grouped as a related production lot are irradiated, and wherein said positioning step is carried out by positioning a sensor on selected ones of objects within the production lot to provide sampling based process control radiation dose information.

19. A method according to claim 1, wherein the sensor comprises a bipolar transistor with an associated Hfe which changes when exposed to radiation, and wherein said determining step comprises analyzing the change in the Hfe.

20. A method according to claim 1, wherein the sensor comprises a diode with a leakage current which changes after exposure to radiation, and wherein said determining step comprises evaluating the leakage current to determine the radiation dose.

21. A method according to claim 1, wherein the object is pet food.

22. A method according to claim 1, wherein the sensor has a flexible low profile body that is substantially planar.

23. A radiation dose evaluation system, comprising:
 a radiation or electron beam source;
 at least one passively powered dosimeter sensor adapted to be positioned on an object undergoing irradiation treatment such that said sensor is exposed to an amount of radiation representative of the amount of radiation exposure of the object;
 at least one wireless reader operably associated with said sensor such that, in operation, it powers said sensor and receives data associated with said sensor;
 a controller operably associated with said wireless reader; and
 a computer program operably associated with said controller, said computer program configured to control powering of the at least one passive dosimeter and analyze data transmitted from said sensor to said wireless reader to determine a radiation dose associated therewith.

24. A radiation dose evaluation system according to claim 23, wherein said source is configured to emit radiation to the object at levels above about 0.01 kGy to below about 30 kGy.

25. A radiation dose evaluation system according to claim 23, wherein said at least one dosimeter is configured to evaluate irradiation in the range of between about 1–5 kGy.

26. A radiation dose evaluation system according to claim 23, wherein said at least one dosimeter comprises a plurality of dosimeters defining a set.

27. A radiation dose evaluation system according to claim 26, wherein the set is configured to evaluate irradiation doses corresponding to the sterilization of poultry.

28. A radiation dose evaluation system according to claim 26, wherein the set is configured to evaluate irradiation doses corresponding to the sterilization of beef.

29. A radiation dose evaluation system according to claim 26, wherein the set is configured to evaluate irradiation doses corresponding to the sterilization of a frozen meat.

30. A radiation dose evaluation system according to claim 26, wherein the set is configured to evaluate irradiation doses corresponding to the sterilization of fruit.

31. A radiation dose evaluation system according to claim 26, wherein the set is configured to evaluate irradiation doses corresponding to the sterilization of vegetables.

32. A radiation dose evaluation system according to claim 26, wherein the set is configured to evaluate irradiation doses corresponding to the sterilization of melon.

33. A radiation dose evaluation system according to claim 26, wherein the set is configured to evaluate irradiation doses corresponding to the sterilization of pet food.

34. A radiation dose evaluation system according to claim 23, wherein said controller is configured such that it controls the radiation exposure or residence time of the object based on the data received from said sensor while said radiation source is actively irradiating the object.

35. A radiation dose evaluation system according to claim 23, wherein said sensor comprises a tank circuit with a MOSFET device, and wherein said MOSFET device has a threshold voltage value which is altered responsive to exposure to a desired irradiation level.

36. A radiation dose evaluation system according to claim 35, wherein said MOSFET has a pre-irradiation voltage value, and wherein said computer program determines the radiation dose based upon a comparison of the altered threshold voltage value with the pre-irradiation threshold voltage value.

37. A radiation dose evaluation system according to claim 23, wherein said sensor comprises a tank circuit including an inductor and a capacitor.

38. A radiation dose evaluation system according to claim 37, wherein said sensor further comprises a MOSFET device, and wherein, in operation, said sensor is configured to generate a first frequency spectrum associated with a pre-irradiation state, and a second frequency spectrum associated with an irradiated state, and wherein said computer program is configured to determine a radiation dose based on a comparison of data provided by the first and second frequency spectrums.

39. A radiation dose evaluation system according to claim 38, wherein said computer program is configured to compare the amplitudes of at least one selected frequency within the first and second frequency spectrums to determine a difference in the threshold voltage values and then to determine a radiation exposure level based thereon.

40. A radiation dose evaluation system according to claim 37, wherein said sensor tank circuit has a resonant frequency associated therewith which changes in response to exposure to irradiation within a desired radiation exposure range, and wherein said computer program is configured to determine a radiation dose based on the change in said tank circuit resonant frequency.

41. A radiation dose evaluation system according to claim 37, wherein said computer program is configured to consider at least one selected electronic parameter value associated with said tank circuit to determine a radiation dose.

42. A radiation dose evaluation system according to claim 23, further comprising a computer program database operably associated with said controller, said database being configured to provide a process history of the object.

43. A radiation dose evaluation system according to claim 23, wherein said sensor comprises a tank circuit with a bipolar transistor having an Hfe associated therewith, and wherein said bipolar transistor Hfe is altered responsive to exposure to radiation in a desired irradiation level.

44. A radiation dose evaluation system according to claim 23, wherein said sensor comprises a tank circuit with a diode, and wherein said diode has a leakage current which is altered responsive to exposure to radiation in a desired irradiation level.

45. A radiation dose evaluation system according to claim 23, wherein the object is food.

46. A radiation dose evaluation system according to claim 23, wherein the sensor has a flexible low profile body.

47. A radiation dose evaluation system, comprising:
 a radiation or electron beam source;
 at least one dosimeter sensor adapted to be positioned on an object undergoing irradiation treatment such that said sensor is exposed to an amount of radiation representative of the amount of radiation exposure of the object;
 at least one wireless reader operably associated with said sensor such that, in operation, it receives data associated with said sensor;
 a controller operably associated with said wireless reader; and a computer program operably associated with said controller, said computer program configured to analyze data transmitted from said sensor to said wireless reader to determine a radiation dose associated therewith, wherein said at least one dosimeter is a single use disposable dosimeter.

48. A radiation dose evaluation system according to claim 47, wherein the sensor has a flexible low profile body and is passively powered.

49. A radiation dose evaluation system, comprising:
a radiation or electron beam source;
at least one passive dosimeter sensor adapted to be positioned on an object undergoing irradiation treatment such that said sensor is exposed to an amount of radiation representative of the amount of radiation exposure of the object;
at least one wireless reader operably associated with said sensor such that, in operation, it powers said sensor and receives data associated with said sensor;
a controller operably associated with said wireless reader; and
a computer program operably associated with said controller, said computer program configured to analyze data transmitted from said sensor to said wireless reader to determine a radiation dose associated therewith, wherein said at least one wireless reader comprises first and second wireless readers, said first reader configured to resonate said sensor before irradiation and said second reader configured to resonate said sensor after irradiation.

50. A radiation dose sensor, comprising:
a capacitor having a dielectric material and two opposing plates configured to sandwich said dielectric material; and
an inductor operably associated with said capacitor,
wherein, in operation, said sensor is configured to be inductively powered by a remote receiver and to wirelessly relay data associated therewith, and wherein said sensor is configured such that it alters at least one predetermined electrical property in responsive to exposure to irradiation in a desired operative range associated with the sterilization of objects.

51. A sensor according to claim 50, wherein said capacitor dielectric material is selected such that it changes at least one associated characteristic upon exposure to radiation and wirelessly relayed and correlated to the amount of radiation the sensor receives to thereby provide a radiation dose sensor.

52. A radiation dose sensor according to claim 51, wherein said sensor has a first resonant frequency prior to exposure to radiation, and a plurality of altered resonant frequencies different from said first resonant frequency, the altered frequencies corresponding to a quantifiable amount of radiation exposure.

53. A radiation dose sensor according to claim 51, wherein said dielectric material change is at least one of an associated conductivity, capacitance value, and dielectric constant.

54. A radiation dose sensor according to claim 50, further comprising a MOSFET device configured to operate within a desired radiation exposure range, and wherein said MOSFET device has a threshold voltage value associated therewith which alters upon exposure to radiation in the desired exposure range.

55. A radiation dose sensor according to claim 50, wherein said sensor is configured to telemetrically relay its resonant frequency during operation.

56. A radiation dose sensor according to claim 50, wherein said sensor is configured to detect radiation doses in the range of from about 0.01–10 kGy.

57. A radiation dose sensor according to claim 50, wherein said sensor is configured to detect radiation doses in the range of from about 10–50 kGy.

58. A radiation dose sensor according to claim 50, wherein said sensor is configured with a low profile when viewed from the side.

59. A radiation dose sensor according to claim 50, wherein said sensor is substantially planar with a flexible body.

60. A radiation dose sensor according to claim 59, wherein said sensor comprises a electronic circuit layer and an underlying label layer, and wherein said circuit layer is releasably attached to said label layer.

61. A radiation dose sensor according to claim 50, wherein said sensor inductor and capacitor defines a tank circuit which has an associated Q factor, wherein said sensor has a first Q factor prior to exposure to radiation above a threshold level, and a plurality of Q factors different from said first Q factor, the plurality of Q factors representing a range of radiation levels which can be correlated to the amount of radiation exposure above the threshold level.

62. A radiation sensor according to claim 50, wherein said sensor is configured to be attached to a sealed food package.

63. A radiation sensor according to claim 50, in combination with a container configured to hold a plurality of food items, wherein said sensor is attached to said container.

64. A sensor according to claim 50, wherein the sensor is configured as a single-use sensor.

65. A sensor according to claim 50, wherein the object is food.

66. A sensor according to claim 65, wherein the object is pet food.

67. A sensor according to claim 50, wherein the object is a medical device.

68. A method for determining the radiation dose of an object or product, comprising the steps of:
positioning a single use dosimetry sensor on an object, wherein said sensor comprises a tank circuit with an inductor and capacitor and a selected electronic component which has an operational parameter which alters when exposed to radiation, wherein the sensor is passively powered and, in operation, is configured to wirelessly relay data to a remote processor;
irradiating the object and the sensor to a level which is sufficient to sterilize the object and to induce alteration in the selected operational parameter of the sensor, wherein the alteration is representative of the amount of irradiation received by the sensor; and
determining the amount of irradiation based on the value of the altered operational parameter of the sensor.

69. A method according to claim 68, wherein the operational parameter is associated with a detectable change in an electronic parameter, and wherein the method further comprises the steps of:
establishing the value of the electronic parameter before radiation; and
detecting the value of the electronic parameter after or during said irradiating step,
wherein said determining step comprises analyzing the established and detected values of the electronic parameter.

70. A method according to claim 69, wherein the object is sealed within a container before said irradiating step.

71. A method according to claim 69, wherein the sensor comprising a tank circuit and a MOS device, the MOS device having a threshold voltage value associated therewith, and wherein said detecting step detects the threshold voltage value of the MOS device and said determining step considers the detected threshold voltage.

72. A method according to claim 71, wherein said method comprises the step of obtaining a pre-irradiation threshold voltage value and obtaining a post-irradiation voltage value and said determining step compares the pre and post irradiation values to determine the radiation dose.

73. A method according to claim 69, wherein the sensor comprises a tank circuit and a diode, the diode having a leakage current associated therewith, and wherein said detecting step is used to estimate the leakage current of the diode and said determining step considers the estimated leakage current.

74. A method according to claim 69, wherein the object is a food item, and wherein said detecting and determining steps are carried out automatically without direct human manipulation of the sensor.

75. A method according to claim 69, further comprising controlling the time the object is exposed to the radiation source.

76. A method according to claim 68, further comprising wirelessly transmitting data from the sensor to a remote reader.

77. A method according to claim 68, wherein the sensor comprises a tank circuit and a bipolar transistor, the transistor having an Hfe value associated therewith, wherein said method comprises obtaining a pre-irradiation Hfe value and a post-irradiation Hfe value and said determining step compares the pre and post irradiation values to determine the radiation dose.

78. A method according to claim 68, wherein the sensor has a substantially planar low profile flexible body.

\* \* \* \* \*